(12) United States Patent
Dhinakaran et al.

(10) Patent No.: US 10,119,523 B2
(45) Date of Patent: Nov. 6, 2018

(54) METHOD FOR MOVING WIND TURBINE COMPONENTS AND A TRANSPORT SYSTEM FOR MOVING WIND TURBINE COMPONENTS

(71) Applicant: Vestas Wind Systems A/S, Aarhus N. (DK)

(72) Inventors: Rajasekaran Dhinakaran, Bergen (NO); Ben Møller Nielsen, Lystrup (DK)

(73) Assignee: Vestas Wind Systems A/S, Aarhus N. (DK)

(*) Notice: Subject to any disclaimer, the term of this patent is extended or adjusted under 35 U.S.C. 154(b) by 0 days.

(21) Appl. No.: 15/736,386

(22) PCT Filed: May 10, 2016

(86) PCT No.: PCT/DK2016/050120
§ 371 (c)(1),
(2) Date: Dec. 14, 2017

(87) PCT Pub. No.: WO2017/000944
PCT Pub. Date: Jan. 5, 2017

(65) Prior Publication Data
US 2018/0171982 A1    Jun. 21, 2018

(30) Foreign Application Priority Data

Jun. 30, 2015   (DK) .................................. 2015 70407

(51) Int. Cl.
*F03D 13/10*   (2016.01)
*F03D 80/80*   (2016.01)
(Continued)

(52) U.S. Cl.
CPC ............. *F03D 13/10* (2016.05); *F03D 13/20* (2016.05); *F03D 13/40* (2016.05); *F03D 80/50* (2016.05);
(Continued)

(58) Field of Classification Search
CPC .......... F05B 2230/6102; F05B 2230/61; F05B 2240/916; F05B 2230/70; F05B 2230/80; B66C 23/207
See application file for complete search history.

(56) References Cited

U.S. PATENT DOCUMENTS

2010/0135792 A1    6/2010  Niehues
2015/0316024 A1*  11/2015  Larsen .................... F03D 1/003
                                                    414/564

FOREIGN PATENT DOCUMENTS

CN      103314211 A     9/2013
DE      102013015562 A1  3/2015
(Continued)

OTHER PUBLICATIONS

European Patent Office, International Search Report and Written Opinion in PCT Application No. PCT/DK2016/050120, dated Jul. 26, 2016.
(Continued)

*Primary Examiner* — Mark C Hageman
(74) *Attorney, Agent, or Firm* — Wood Herron & Evans LLP

(57) ABSTRACT

A method for moving a wind turbine component (42) relative to a wind turbine (16) having a tower (18) with a door (26) for closing off an opening (90) through the tower (18) includes removably positioning a transport system (40) relative to the wind turbine (16), the transport system (40) having a track (44) and a powered drive device (118), such that a first end (78) of the track (44) is positioned outside the
(Continued)

tower (18), a second end (80) of the track (44) is positioned inside the tower (18), and the track (44) extends through the opening (90) in the tower (18). The transport system (40) is configured to facilitate movement of the wind turbine component (42) between an inside of the tower (18) and an outside of the tower (18) through the opening (90). The method further comprises moving the wind turbine component (42) vertically within the tower (18) away from or toward the track (44) using the powered drive device (118) of the transport system (40). A transport system (40) for implementing such a method is also disclosed.

21 Claims, 22 Drawing Sheets

(51) Int. Cl.
  *F03D 13/40* (2016.01)
  *F03D 80/50* (2016.01)
  *F03D 13/20* (2016.01)

(52) U.S. Cl.
  CPC .......... *F03D 80/88* (2016.05); *F05B 2230/61* (2013.01); *Y02E 10/72* (2013.01); *Y02P 70/523* (2015.11)

(56) References Cited

FOREIGN PATENT DOCUMENTS

| | | |
|---|---|---|
| EP | 2317138 A2 | 5/2011 |
| WO | 2013080392 A1 | 6/2013 |
| WO | 2014082643 A1 | 6/2014 |
| WO | 2014206840 A1 | 12/2014 |

OTHER PUBLICATIONS

Danish Patent and Trademark Office, Search and Examination Report in PA 2015 70407, dated Jan. 26, 2016.

\* cited by examiner

METHOD FOR MOVING WIND TURBINE COMPONENTS AND A TRANSPORT SYSTEM FOR MOVING WIND TURBINE COMPONENTS

TECHNICAL FIELD

The invention relates generally to wind turbines and, more particularly, to a transport system for moving wind turbine components into and/or out of a wind turbine tower, and a method of moving wind turbine components into and/or out of a wind turbine tower using such a transport system.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator.

In addition to these components, a wind turbine also includes a number of components for regulating the electrical energy produced by the wind turbine. For example, wind turbines often include a transformer, converter, and other electrical components that regulate the electrical energy so that it may be fed to a power grid in a certain manner. These electrical components can be relatively large, heavy items and are expected to become even larger and heavier as wind turbines and their power production continues to increase. These electrical components are typically located in the nacelle adjacent to, for example, the generator. However, as the size of these components increases and the space within the nacelle becomes more limited, alternative locations for the transformer, converter, and other components have been considered. In some wind turbine designs, for example, these components have been located within the tower, and more specifically, adjacent the base of the tower.

The working life of many of these electrical components is less than the working life of the wind turbine. In this regard, the electrical transformer in the wind turbine may have a working life of about twelve years while the wind turbine itself (e.g., blades, tower, etc.) may be designed for a working life of about twenty years. Accordingly, wind turbine designers and manufacturers have to make allowances for removing and replacing these electrical components during the working life of the wind turbine. However, it can be difficult, time consuming, and expensive to remove and replace these various components. For example, when these components are located in the nacelle, large and expensive cranes are typically used to remove and replace the components. When these components are located adjacent the bottom of the tower, expensive and complex internal crane systems must be included within the tower to allow the components to be moved through the door or hatch way typically located at the base of the tower. In any event, component removal and replacement is not easily achieved.

WO 2014/082643 provides a transport system having a track and a carriage movably coupled to the track for moving wind turbine components into and out of the wind turbine through an opening in the wind turbine tower. However, the disclosed transport system and associated method requires that the wind turbine be equipped with an internal winch system, typically supported by the inner wall of the tower, for lowering and/or raising the wind turbine components vertically within the wind turbine tower.

While such a system is successful for its intended purpose, wind turbine designers and manufacturers continually strive to improve upon apparatuses and methods associated with the operation and maintenance of a wind turbine. Aspects of the present invention provide certain improvements to current systems and methods associated with wind turbine maintenance.

SUMMARY

A method for moving a wind turbine component relative to a wind turbine having a tower with a door for closing off an opening through the tower includes removably positioning a transport system relative to the wind turbine, the transport system having a track and a powered drive device, such that a first end of the track is positioned outside the tower, a second end of the track is positioned inside the tower, and the track extends through the opening in the tower. The transport system is configured to facilitate movement of the wind turbine component between an inside of the tower and an outside of the tower through the opening. The method further comprises moving the wind turbine component vertically within the tower away from or toward the track using the powered drive device of the transport system.

In an exemplary embodiment, the method may further include removably coupling a hoist assembly to a support structure of the tower positioned above the opening in the tower and above the wind turbine component. The hoist assembly includes a plurality of sheaves. The method then includes operatively coupling the hoist assembly and the powered drive device via one or more feed cables, operatively coupling the hoist assembly to the wind turbine component, and activating the powered drive device to move the wind turbine component vertically within the tower. In one embodiment, operatively coupling the hoist assembly and the powered drive device further comprises extending one or more feed cables through one or more sheaves at the second end of the track.

In an exemplary embodiment, the powered drive device of the transport system may also be used to move the wind turbine component along the track and through the opening in the tower. In this regard, the powered drive device is selectively coupleable to the transport system in a first and second position, the method further comprising coupling the powered drive device to the transport system in the first position when moving the wind turbine component vertically within the tower, and coupling the powered drive device to the transport system in the second position when moving the wind turbine component along the track, such as in a substantially horizontal direction, through the opening. In one embodiment, the track is modular in its design and the method may further include assembling the track by coupling a plurality of track segments in an end-to-end fashion.

In one embodiment, the method may be used for removing the wind turbine component from the wind turbine. In this regard, the method further includes removably coupling a hoist assembly to a support structure of the tower above the opening in the tower and above the wind turbine component, the hoist assembly including a plurality of sheaves; operatively coupling the hoist assembly and the powered drive device via one or more feed cables; activating the powered drive device to vertically raise the component off of a platform located within the tower and above the door; activating the powered drive device to vertically lower the component onto the track; moving the wind turbine component along track from inside the tower to outside the tower such that the wind turbine component is completely positioned outside the tower; and removing the wind turbine component from the transport system. In one embodiment, the method further includes moving at least a part of the platform to allow the wind turbine component to pass the platform.

The method may further include installing another wind turbine component into the wind turbine. This includes positioning the another wind turbine component on the track; moving the another wind turbine component along the track from outside the tower to inside the tower; activating the powered drive device to vertically raise the another wind turbine component off of the track and above the platform; and activating the powered drive device to vertically lower the another wind turbine component onto the platform. In one embodiment, the method further includes moving at least a part of the platform to prevent the another wind turbine component from passing the platform.

In one embodiment, moving the wind turbine component along the track may include operatively coupling the powered drive device to the wind turbine component, and activating the powered drive device to move the wind turbine component along the track. Similarly, moving the another wind turbine component along the track may include operatively coupling the powered drive device to the another wind turbine component, and activating the powered drive device to move the another wind turbine component along the track.

In accordance with the method, the powered drive device is selectively coupleable to the transport system in a first and second position. The method further comprises coupling the powered drive device to the transport system in the first position when moving a wind turbine component vertically within the tower, and coupling the powered drive device to the transport system in the second position when moving a wind turbine component along the track.

In one embodiment, the method may be used for installing the wind turbine component within the wind turbine. In this regard, the method includes positioning the wind turbine component on the track; moving the wind turbine component along the track from outside the tower to inside the tower; removably coupling a hoist assembly to a support structure of the tower above the opening in the tower and above the wind turbine component, the hoist assembly including a plurality of sheaves; operatively coupling the hoist assembly and the powered drive device via one or more feed cables; activating the powered drive device to vertically raise the wind turbine component off of the track and above the platform; and activating the powered drive device to vertically lower the wind turbine component onto the platform.

In accordance with another embodiment, a transport system for moving a wind turbine component into or out of a wind turbine having a tower with a door for closing off an opening through the tower includes a track having a first end configured to be positioned outside of the tower and a second end configured to be coupled to an inner wall of the tower such that the track extends through the opening in the tower. A carriage is configured to be movably coupled to the track and further configured to receive the wind turbine component thereon for movement of the wind turbine component into or out of the wind turbine through the opening. A powered drive device is configured to be coupled to the track. Additionally, a hoist assembly is configured to be coupled to a support structure of the tower above the opening in the tower and above the wind turbine component, the hoist assembly including a plurality of sheaves. The powered drive device is configured to be operatively coupled to the hoist assembly via one or more feed cables and operable to move the wind turbine component vertically within the tower and away from or toward the track.

In an exemplary embodiment, the transport system may include one or more sheaves coupled to the track adjacent the second end for guiding the one or more feed cables from the powered drive device to the hoist assembly. The transport system may also include one or more sheaves coupled to the track adjacent the first end for guiding the one or more feed cables from the powered drive device toward the one or more sheaves adjacent the second end of the track.

In an embodiment, the powered drive device is configured to be operatively coupled to the carriage via one or more feed cables and operable to move the wind turbine component along the track. The transport system may include one or more sheaves coupled to the track adjacent the second end for guiding the one or more feed cables from the powered drive device to the carriage. The transport system may also include one or more sheaves coupled to the track adjacent the first end for guiding the one or more feed cables from the powered drive device toward the one or more sheaves adjacent the second end of the track.

In an exemplary embodiment, the powered drive device is selectively coupleable to the track in a first position and a second position. The powered drive device is configured to be coupled to the track in the first position when moving the wind turbine component vertically within the tower. The powered drive device is further configured to be coupled to the track in the second position when moving the wind turbine component along the track.

In one embodiment, the track has a modular design and includes a plurality of track segments configured to be coupled in an end-to-end fashion to form the track. Furthermore, the powered drive device may include one or more winch systems.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
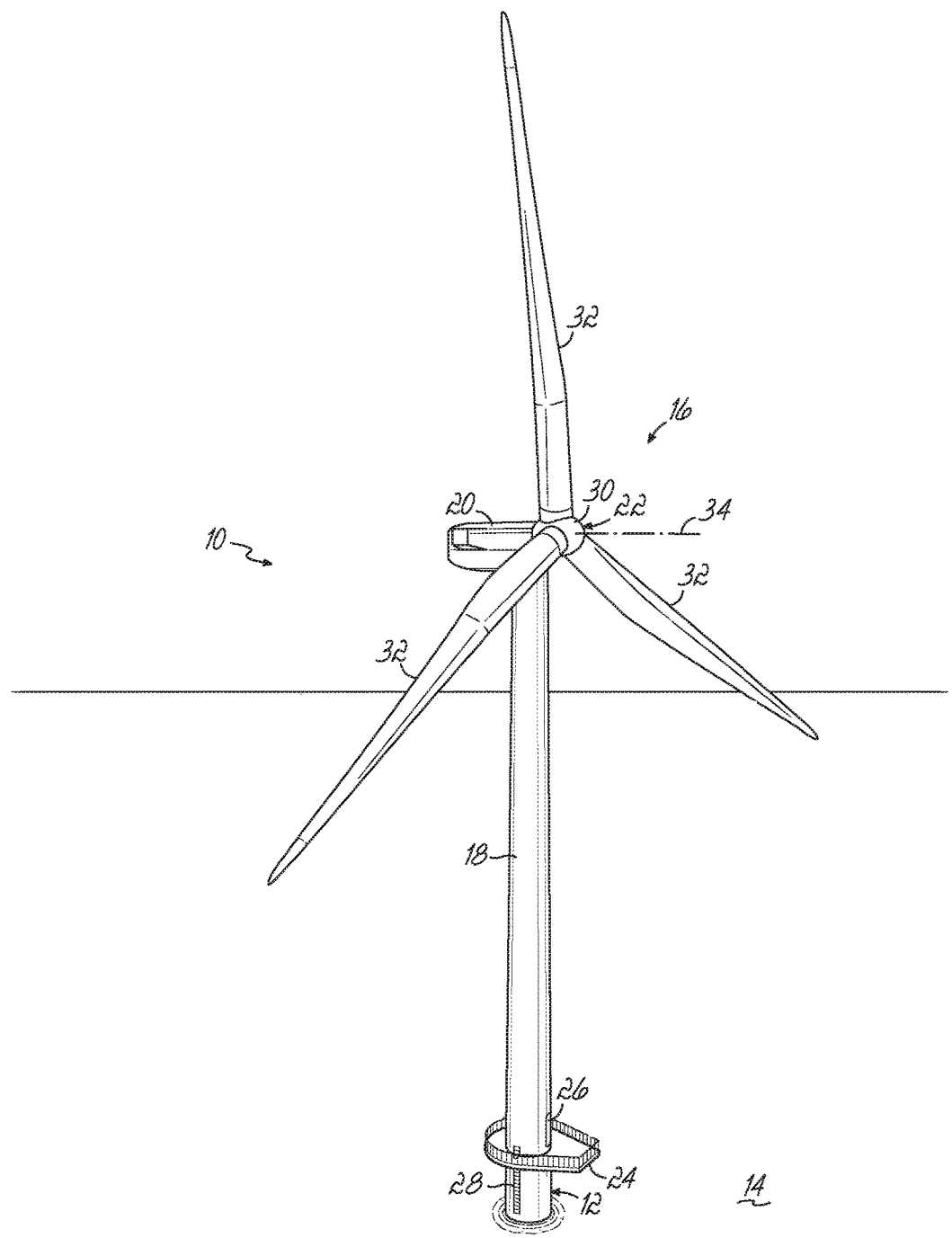
FIG. 1 is a perspective view of a wind turbine with which embodiments of the present invention may be used.

With reference to FIG. 1, an offshore wind turbine installation 10 includes a foundation 12 generally disposed in a body of water 14 and a wind turbine 16 fixedly secured to the foundation 12. A number of foundation designs may be used to support the wind turbine 16 including, for example, a monopile or truss foundation supported by the sea bed, and various floating foundation designs. The wind turbine 16 includes a tower 18, a nacelle 20 disposed at the apex of the tower 18, and a rotor 22 operatively coupled to a generator (not shown) housed inside the nacelle 20. The tower 18 supports the load presented by the nacelle 20, the rotor 22, and other components of the wind turbine 16 that are housed inside the nacelle 20, and also operates to elevate the nacelle 20 and rotor 22 to a height above sea level at which faster moving air currents of lower turbulence are typically found. As is typical of offshore installations, the wind turbine 16 includes an exterior platform 24 and a hatch or door 26 at the base of the tower 18 for allowing personnel, tooling, equipment, etc. to access the interior of the tower 18. In this regard, for example, a ladder 28 may extend downwardly from the platform 24 to allow personnel in a boat or other sea vessel to access the platform 24.

The rotor 22 of the wind turbine 16, which is represented as a horizontal-axis wind turbine, serves as the prime mover for the electromechanical system. Wind exceeding a minimum level will activate the rotor 22 and cause rotation in a plane substantially perpendicular to the wind direction. The rotor 22 of wind turbine 16 includes a central hub 30 and at least one blade 32 that projects outwardly from the central hub 30 at locations circumferentially distributed thereabout. In the representative embodiment, the rotor 22 includes three blades 32, but the number may vary. The blades 32 are configured to interact with the passing air flow to produce lift that causes the central hub 30 to spin about a longitudinal axis 34.

The wind turbine 16 may be included among a collection of similar wind turbines belonging to an offshore wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. In this regard, the wind turbine 16 may include various electrical components, such as transformers, converters, etc., that facilitate supplying electrical power generated by the generator to the power grid.

Figure 2:
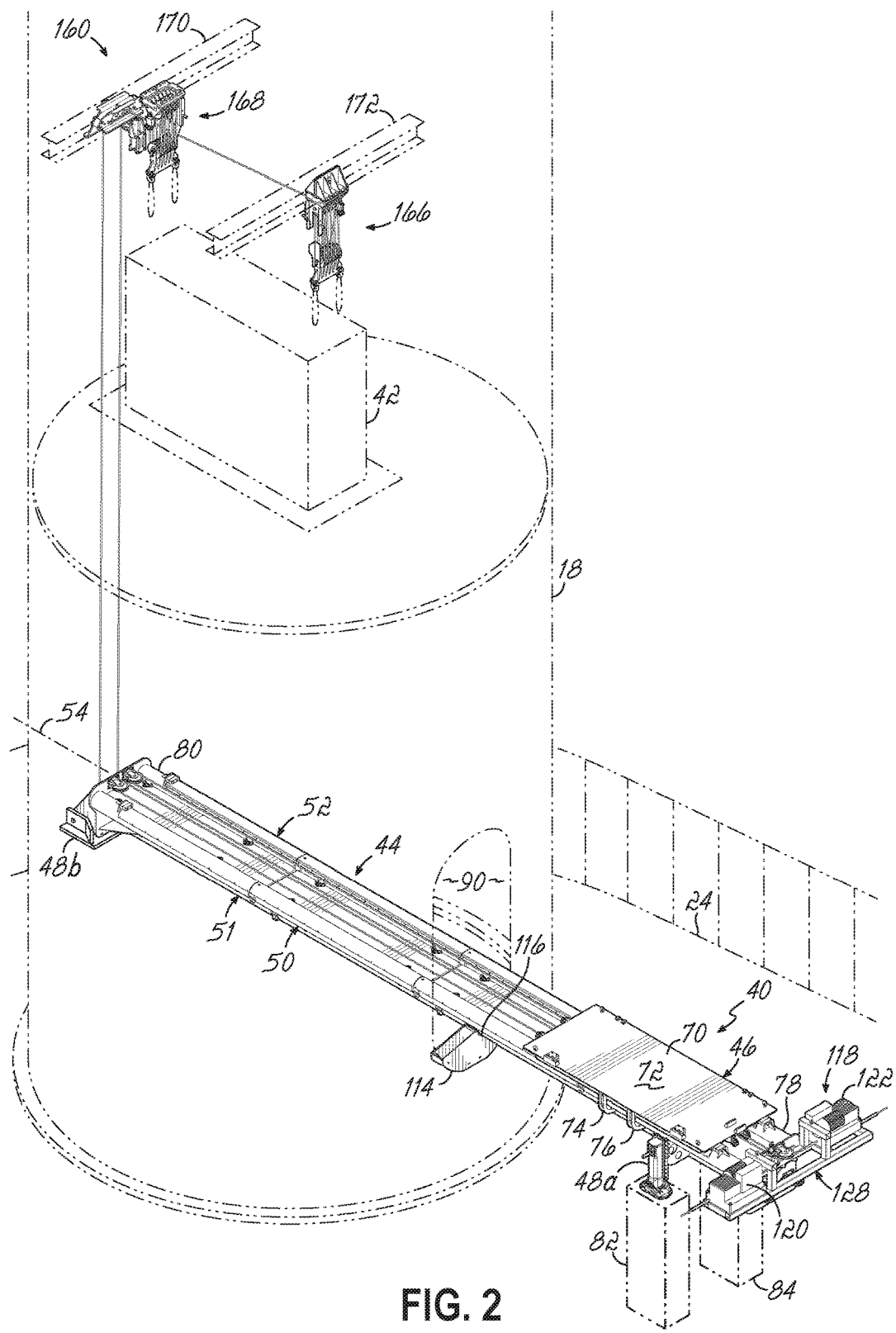
FIG. 2 is a perspective view of a transport system in accordance with one embodiment of the invention.

As noted above, during the working life of wind turbine 16 it may be necessary to remove various wind turbine components from the wind turbine 16 and replace the component with a new or refurbished component. In this regard, FIG. 2 illustrates an exemplary embodiment of a transport system, generally shown at 40, for moving a wind turbine component 42 out of the wind turbine 16, such as during a removal procedure, and/or moving a wind turbine component into the wind turbine 16, such as during an installation or replacement procedure. In an exemplary embodiment, the transport system 40 is configured to be used to move wind turbine components to/from the wind turbine tower 18 via the door 26 at the base of the tower 18. More particularly, the transport system 40 is configured to allow wind turbine components to be moved into and/or out of the wind turbine tower 18 via the door 26 in a relatively easy, time efficient, and cost efficient manner that obviates the need for large, complex, and expensive cranes (internal or external). Moreover, in an exemplary embodiment, the wind turbine component 42 being moved by transport system 40 is described herein as an electrical transformer. However, the invention is not so limited, as the particular wind turbine component to be used in conjunction with the transport system 40 may vary depending on the specific application or need of the wind turbine owner.

Figure 3:
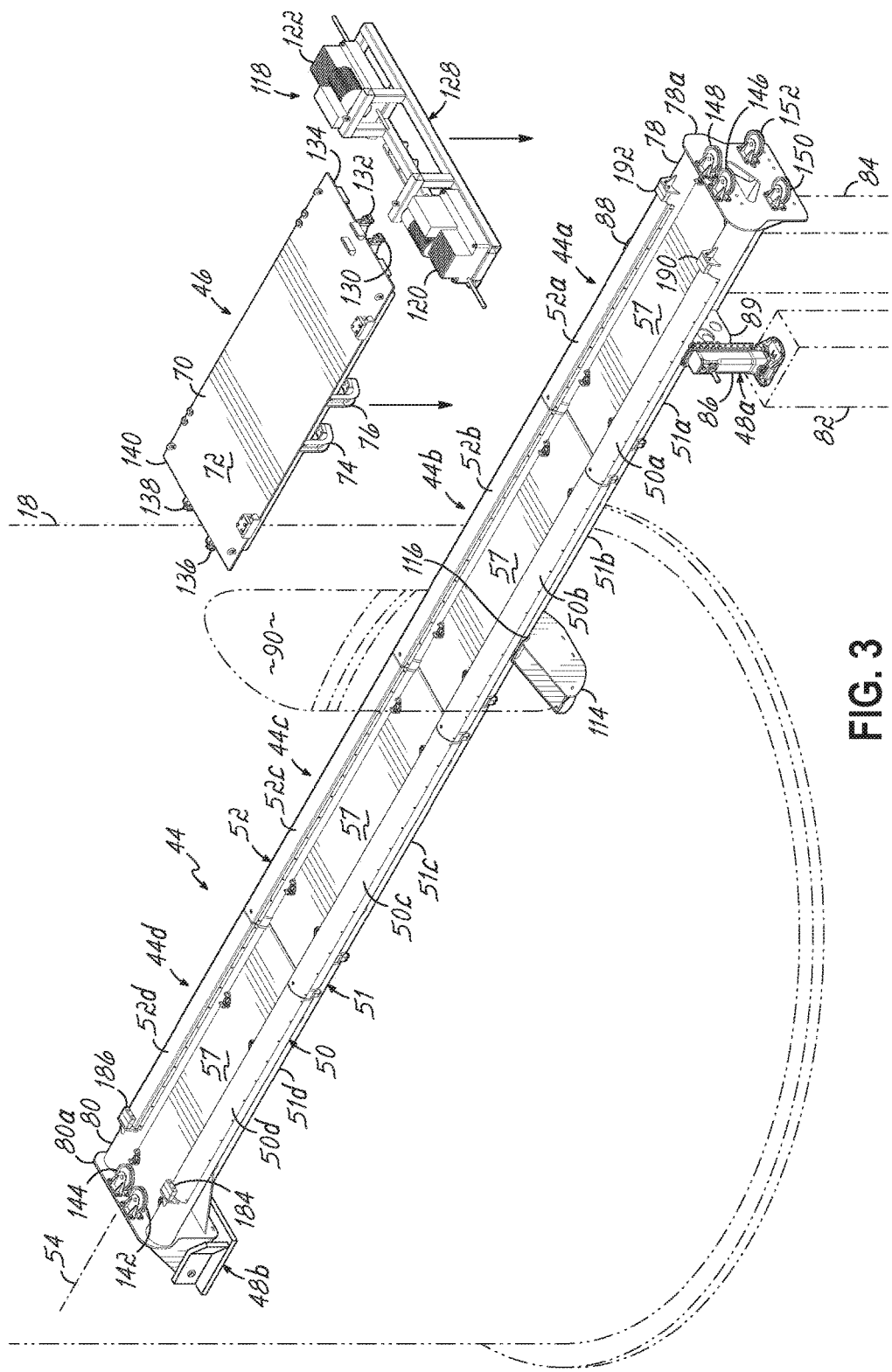
FIG. 3 is an assembly view of a portion of the transport system of FIG. 2.

As illustrated in FIGS. 2 and 3, in one embodiment, the transport system 40 includes a track 44, a carriage 46 movably coupled to the track 44, and one or more support frames 48a, 48b for supporting the track 44 relative to the wind turbine 16. In one embodiment, the track 44 includes a pair of spaced apart, generally parallel rails 50, 52 which generally define a longitudinal axis 54. In the embodiment shown, rail 50 has a generally arcuate configuration, and rail 52 has a generally flat configuration, the different configurations configured to limit unintended sideways movement of the carriage 46 when on the track 44. One or both of these configurations may be achieved by a cap or cover applied to a top of the rails 50, 52. However, it will be appreciated that other configurations of rails are possible. In one embodiment, the track 44 may have a truss design including a base support rail 51 positioned below and between the rails 50, 52 and coupled to rails 50,52 via one or more support frames. The rails 50, 51, 52 may be made out of steel or other suitable materials sufficient to handle the loads being imposed thereon during use of the transport system 40.

Figure 3A:
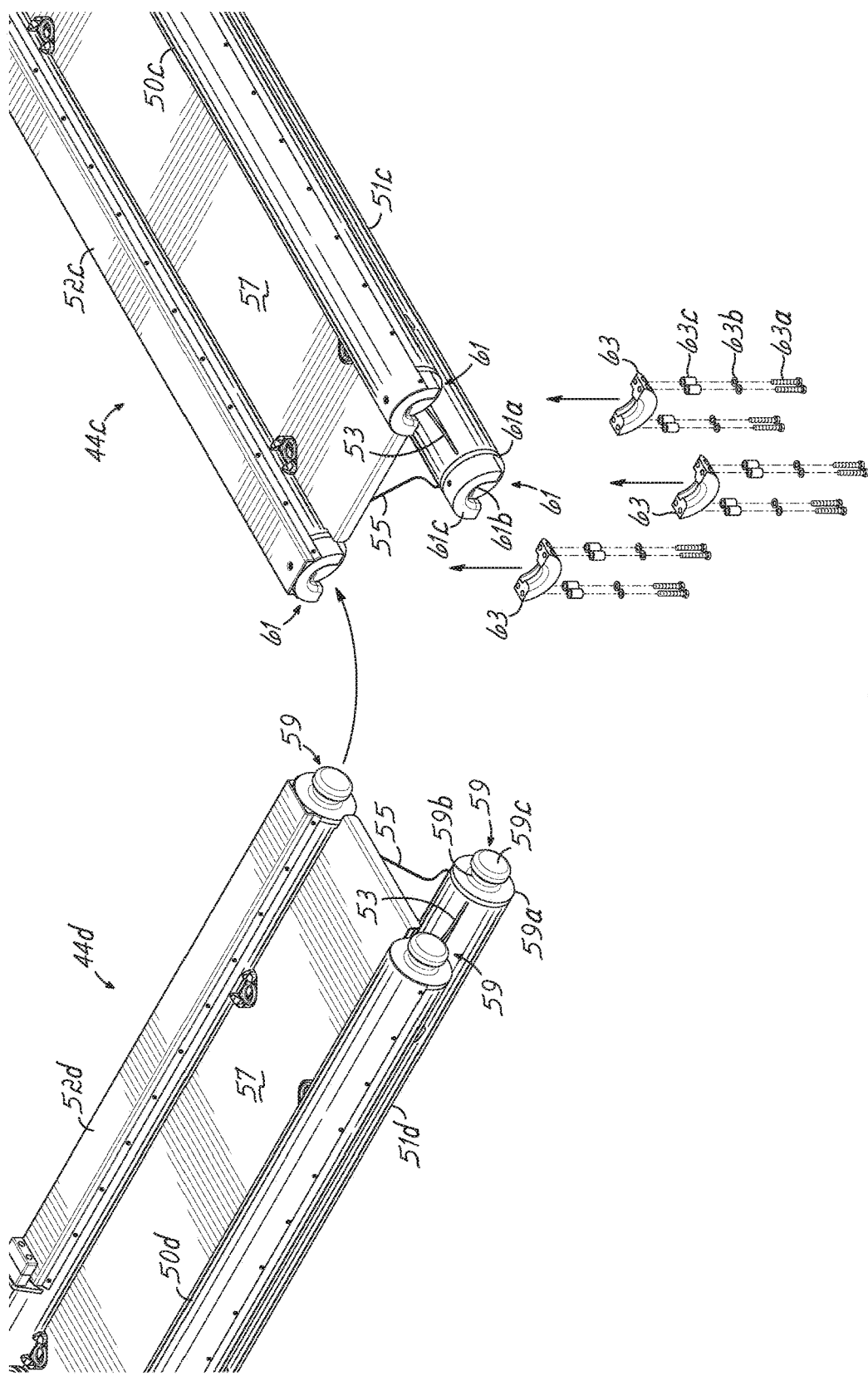
FIG. 3A is an assembly view of a portion of the transport system of FIG. 2 illustrating a modular design of a track of the transport system.
Figure 3B:
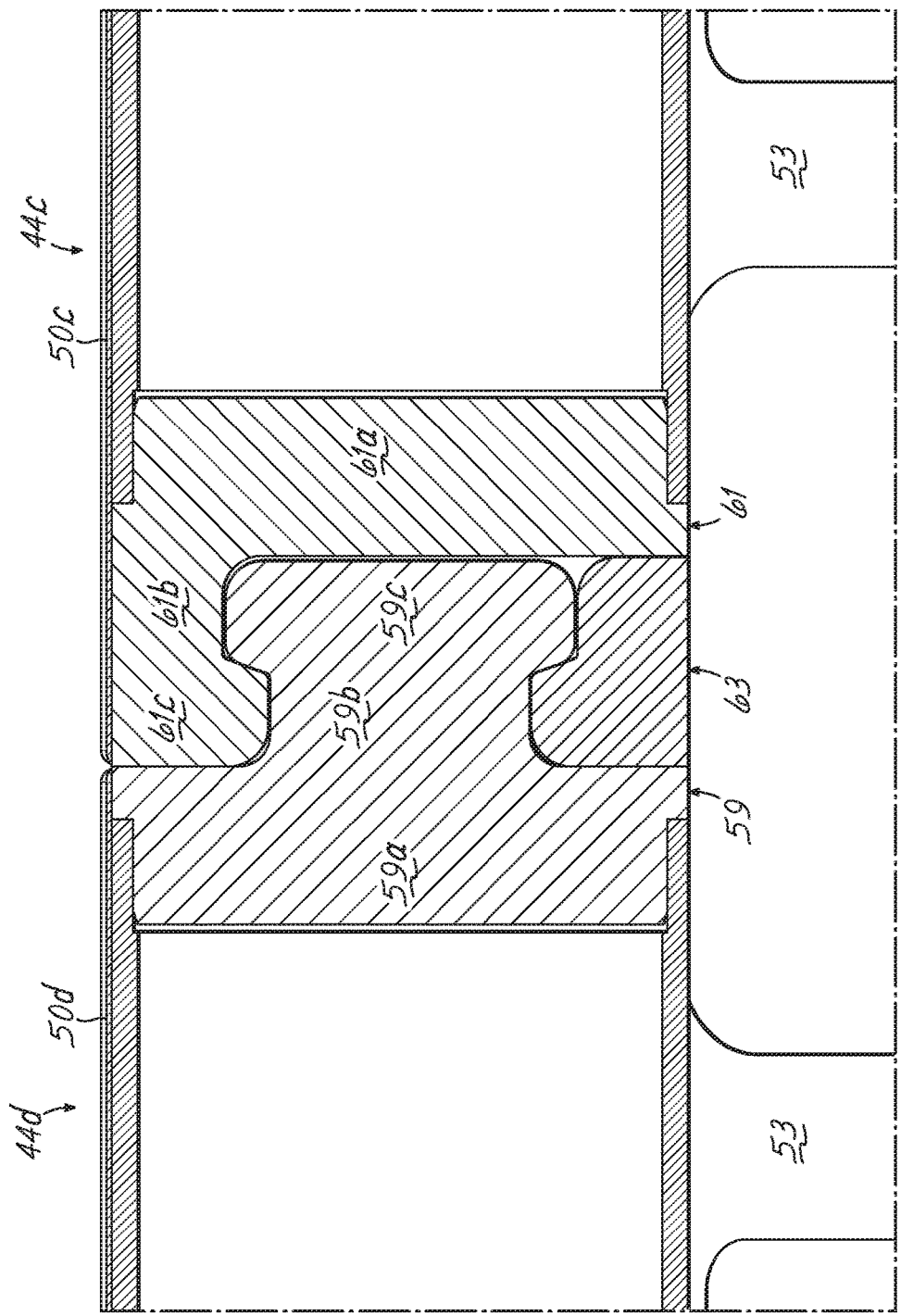
FIG. 3B is a cross sectional view of the assembly of FIG. 3A illustrating the connection between two adjacent track segments.

As shown in FIGS. 2-3B, in an exemplary embodiment each of the rails 50, 51, 52 may have a modular design comprising a plurality of rail segments coupled in an end-to-end fashion to collectively form the rails 50, 51, 52. More particularly, the track 44 includes a plurality of track segments 44a, 44b, 44c, 44d, which are coupled together in an end-to-end fashion to collectively form the track 44. By forming the track 44 in segments, it is intended to be more easily manipulated by workers at the wind turbine installation 10 during, for example, assembly and disassembly. This configuration may also allow the transport system 40 to be more easily stored at the wind turbine site or stowed on board a seafaring vessel that provides maintenance to the wind turbine 16. In the embodiment shown, the track 44 includes four track segments 44a, 44b, 44c, 44d. However, any number of track segments may be used, depending on the application and the desired length.

Each track segment 44a, 44b, 44c, 44d includes a pair of spaced apart, generally parallel rail segments 50a, 50b, 50c, 50d, 52a, 52b, 52c, 52d, a base support rail segment 51a, 51b, 51c, 51d, and first and second cross support frames 53, 55 configured to couple the base support rail segment 51a, 51b, 51c, 51d to the rail segments 50a, 50b, 50c, 50d, 52a, 52b, 52c, 52d, respectively, such that each track segment may have a generally v-shaped cross section (FIG. 3A). In one embodiment, the cross support frames 53, 55 may include both straight members (e.g., at the upper and lower ends) and diagonal members (in between the straight members). In addition or alternatively, the cross support frames may include x-members (not shown). A host of other arrangements may also be possible. As shown, each track segment 44a, 44b, 44c, 44d may include a support panel 57 positioned between the parallel rail segments 50a, 50b, 50c, 50d, 52a, 52b, 52c, 52d, respectively.

Each track segment 44a, 44b, 44c, 44d is configured to be coupled to the adjacent track segment(s) such that, when the track segments are coupled together, the rail segments 50a, 50b, 50c, 50d, 51a, 51b, 51c, 51d, 52a, 52b, 52c, 52d collectively form the track 44. In this regard, each rail segment 50a, 50b, 50c, 50d, 51a, 51b, 51c, 51d, 52a, 52b, 52c, 52d may include a male coupler 59 or a female coupler 61. More specifically, each rail segment 50b, 50c, 51b, 51c, 52b, 52c of an intermediate track segment 44b, 44c may include a male coupler 59 at one end and a female coupler 61 at the opposite end, whereas each rail segment 50a, 50d, 51a, 51d, 52a, 52d of an end track segment 44a, 44d may include either a male coupler 59 or a female coupler 61 at one end, as may be appropriate.

As shown, each male coupler 59 includes a base 59a, a neck 59b, and a head 59c having a cross section larger than that of the neck 59b. Each female coupler 61 includes a base 61a and adjacent first and second generally c-shaped receptacles 61b, 61c, the first receptacle 61b being sized to receive the neck 59b of the male coupler 59 and the second receptacle 61c being sized to receive the head 59c of the male coupler. In this manner, the female coupler 61 may be positioned over and mate with the male coupler 59. Next, a generally c-shaped lock collar 63 may be fitted over the male coupler 59 and removably coupled to the female coupler 61, such as, for example, by way of screws 63a, washers 63b, and sleeves 63c. However, the collar 63 may be coupled to the female coupler 61 by any suitable fastener. As shown, the collar 63 may have a generally stepped configuration corresponding to the neck 59b and the head 59c of the male coupler 59 so as to retain the male coupler in position.

While an exemplary embodiment provides a modular configuration of the track 44, those of ordinary skill in the art will realize that other configurations are contemplated to be within the scope of the invention. In this regard, in an alternative embodiment, the track may be provided as a monolithic or unitary system that requires little pre-assembly prior to deployment on the wind turbine. Thus, the invention is not necessarily limited to the modular design described above.

The carriage 46 is configured to be movably coupled to the track 44 and further configured to receive the wind turbine component 42 thereon so as to be movable along the track 44. In this regard, the carriage 46 includes a generally rectangular, planar carriage platform 70 configured to receive the wind turbine component 42 on an upper surface 72 thereof, and coupling members 74, 76 coupled to the carriage platform 70 and further configured to be coupled to the track 44. The carriage platform 70 may be a generally solid member or alternatively, a lattice of several structural frame members. The coupling members 74, 76 may include a plurality of bearing pad units having, for example, low-friction characteristics so as to facilitate sliding movement of the carriage 46 along the track 44. In another embodiment, the rails 50, 52 may be lubricated or may also include bearing pad units configured to engage bearing pad units on the carriage, and thereby further reduce the frictional movement of the carriage 46 along the track 44. In yet another embodiment, the coupling members 74, 76 may include a plurality of roller units having a hub coupled to the carriage platform 70 and further including one or more wheels or rollers for movably supporting the carriage platform on the rails 50, 52. Such alternatives may be more fully described in WO 2014/082643, the disclosure of which is incorporated by reference herein in its entirety.

As illustrated in FIGS. 2 and 3, the transport system 40 further includes one or more support frames 48a, 48b for supporting the track 44, as well as the carriage 46 and wind turbine component 42 during, for example, use of the transport system 40. In this regard and in an exemplary embodiment, transport system 40 includes a first support frame 48a adjacent a first end 78 of the track 44 and a second support frame 48b adjacent a second end 80 of the track 44. As can be seen in FIG. 2, during use of the transport system 40, the first end 78 may be positioned outside of the wind turbine tower 18 and the first support frame 48a engages supports 82, 84 (shown in phantom) to support the track 44. The supports 82, 84 may be positioned, for example, on an upper surface of the platform 24 or on any other suitable surface. Alternatively, the first support frame 48a may engage an upper surface of the platform 24 to support the track 44.

The first support frame 48a may include a pair of spaced apart legs 86, 88 each connected to the track 44 by a respective bracket 89. In one embodiment, the legs 86, 88 may be connected to each other by an intermediate frame member. In addition or alternatively, the support posts 82, 84 may be connected to each other by an intermediate frame member. The first support frame 48a may be made from steel or other suitable materials sufficient to handle the loads being imposed thereon through use of the transport system 40.

In one embodiment, the first support frame 48a may have an adjustable height so as to raise or lower the track 44 relative to the support posts 82, 84 or platform 24 in order to meet the needs of a specific application. For example, the height of the first support frame 48a may be configured such that the track 44 is substantially horizontal and generally parallel to an upper surface of the posts 82, 84 or the platform 24. Alternatively, the first support frame 48a may be configured such that the track 44 is angled upwardly or downwardly. By way of example, the track 44 may be angled depending on whether the wind turbine component 42 is being moved out of the wind turbine tower 18 or being moved into the wind turbine tower 18. In this regard, each of the legs 86, 88 may move within a housing or shroud and include one or more locking pins that engage corresponding bores in the legs and housing to lock the relative position of the legs 86, 88 (not shown). The bores are configured such that different bores provide a different height of the first support frame 48a. Alternatively, each leg 86, 88 may include an actuator, such as a hydraulic actuator (not shown), for extending or retracting the legs 86, 88 in order to provide a desired height.

Additionally, the position of the first support frame 48a in the longitudinal direction defined by axis 54 may also be varied. This may vary, for example, based on the size or weight of the wind turbine component 42 being moved out of or into the wind turbine tower 18. The final positioning of the wind turbine component 42 on the transport system 40, from which the component would be removed therefrom, might also affect the position of the first support frame 48a. Moreover, in the embodiment shown, the track 44 may be fixedly coupled to the first support frame 48a, such as with a suitable fastener or the like. Alternatively, however, the track 44 may simply abut, but not be fixedly coupled to, the first support frame 48a.

Figure 4:
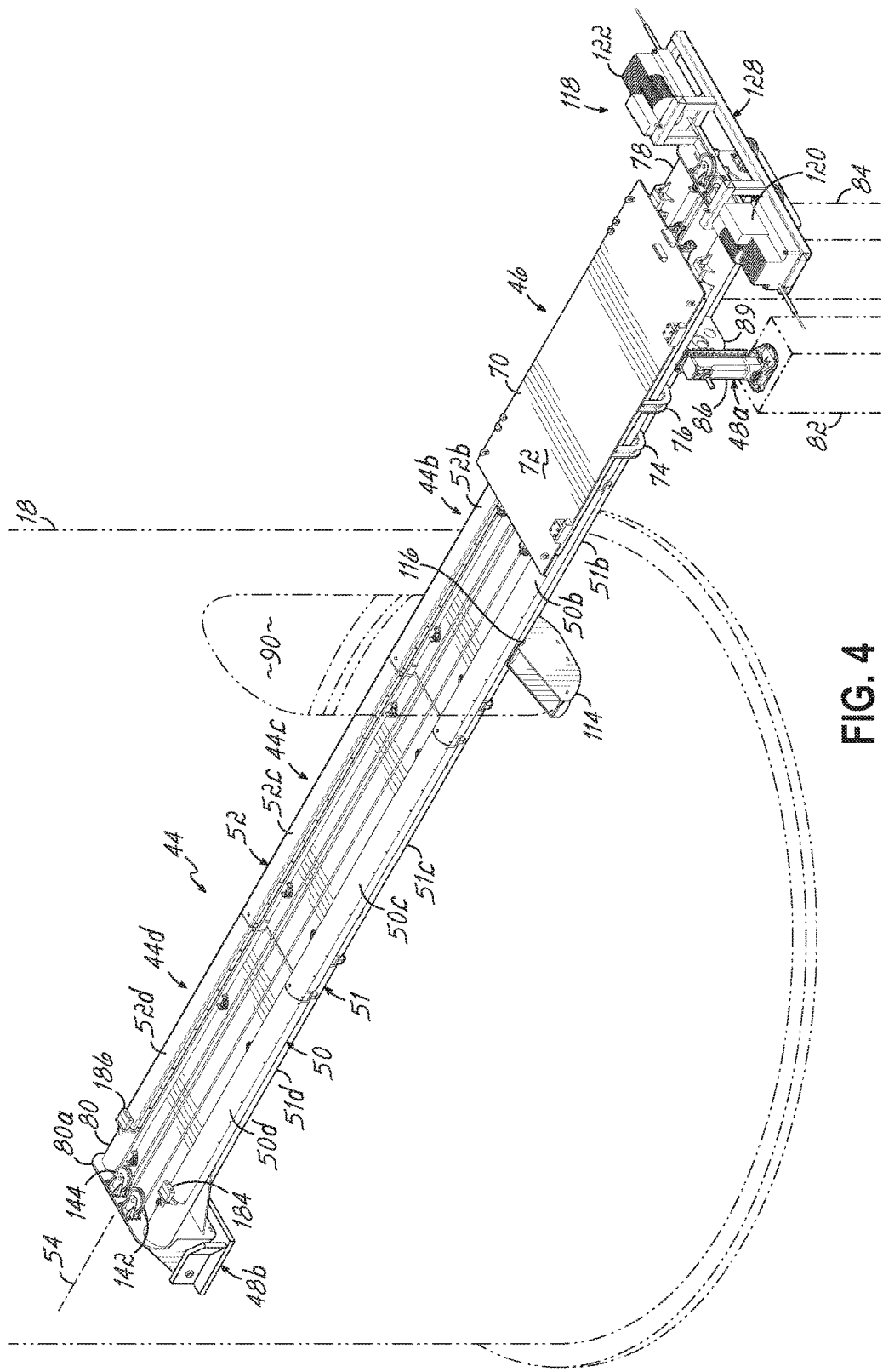
FIG. 4 is a perspective view of the transport system of FIG. 2 illustrating the powered drive device arranged in an upper position for moving the carriage along the transport system.

As can be further seen in FIGS. 2-4, during use, the track 44 extends through an opening 90 in the tower wall normally closed off by door 26 such that the second end 80 of the track 44 is disposed inside of the wind turbine tower 18. In one embodiment, the second support frame 48b may include a bracket configured to couple the transport system 40 to an inner wall or surface 92 of the tower 18, which, for example, may be generally opposite to opening 90. In this way, a portion of the track 44 spans an inner cross dimension (e.g., diameter) of the tower 18, for purposes that will be discussed in more detail below. By way of example, the second support frame 48b may be fixed, such as through welding, bolting, magnets, etc., to the inner surface 92 of the tower 18 and configured to couple to the track 44. In one embodiment, rails 50, 52 may abut the second support frame 48b to support the track 44. In another embodiment, however, the rails 50, 52 may be fixedly coupled to the second support frame 48b to prevent undesired movement of the rails 50, 52 away from the tower wall.

In an exemplary embodiment, the rails 50, 52 may be coupled to the second support frame 48b using nuts and bolts, various locking pins, or other fasteners. In the embodiment shown, the second support frame 48b includes a base plate 94, a central bracket member 96, and first and second bracket plates 98, 100. The central bracket member 96 and the first and second bracket plates 98, 100 are spaced apart to receive corresponding track brackets 102, 104 extending from the second end of the track 44. The central bracket member 96, first and second bracket plates 98, 100, and track brackets 102, 104 each include holes that may be aligned for receiving split bolts 106, 108 therethrough. In one embodiment, sleeves 106a, 108a may be provided over the split bolts 106, 108, which may be held in position by associated split pins 110, 112, in order to lock the rails 50, 52 to the second support frame 48b. As shown, first and second bracket plates 98, 100 may be bent or angled in an outward direction to facilitate guiding the track brackets 102, 104 therebetween.

In the embodiment shown, a doorframe support bracket 114 may be positioned within a bottom portion of the opening 90 normally closed off by door 26 in order to provide added support and stability to the track 44. The doorframe support bracket 114 may be sized and shaped to be received over a portion of the doorframe associated with the opening 90 in order to secure the doorframe support bracket 114 therein. The doorframe support bracket 114 may include a track support surface 116 which may be, for example, flat or shaped to receive a portion of the track 44, such as the support rail 51. In one embodiment, the support rail 51 may engage the doorframe support bracket 114 to support the track 44 and to protect the adjacent tower wall. In another embodiment, however, the support rail 51 may be fixedly coupled to the doorframe support bracket 114 to prevent undesired movement of the rails 50, 52 within the opening 90.

In an exemplary embodiment, the transport system 40 may further include a powered drive device 118. In accordance with one aspect of the invention, the powered drive device 118 of the transport system 40 may be used to move the wind turbine component 42 vertically within the wind turbine tower 18. As explained above, the movement of components vertically within wind turbine towers has conventionally been achieved by internal winch systems coupled to the inner wall of the wind turbine and which form essentially a permanent part of the wind turbine. This is in contrast to aspects of the present invention, in which the powered drive device 118 of the transport system 40 is utilized to move wind turbine components 42 vertically within wind turbine towers 18, such as, for example, relative to (away from or toward) the track 44. This obviates the need to have an internal winch system for every wind turbine, which in turn reduces costs. Additionally, the issue of high, localized stress concentrations in the wind turbine wall at the connection site of the internal winch systems is also addressed by aspects of the present invention.

In an exemplary embodiment, which is described more fully below, the powered drive device 118 may not only be used to move wind turbine components 42 vertically within the wind turbine tower 18, but may also be used to move the components 42 along the track 44 into and/or out of the wind turbine 16, such as through the door opening 90 thereof. It should be realized, however, that such movement along the track 44 may be achieved through another process, such as manually, for example, and the powered drive device 118 may provide only the vertical movement of components within the wind turbine tower 18.

According to an exemplary embodiment, the transport system 40 may include a powered drive device 118 for moving the carriage 46 along the track 44 in a preferred direction, such as along longitudinal axis 54. As illustrated in FIG. 2, in one embodiment, the powered drive device 118 may include first and second winch systems 120, 122 comprising one or more rotatable drums having respective feed cables 124a, 126a wrapped thereabout. The feed cables 124a, 126a may be fed into the winch systems 120, 122 from cable spools (not shown) via cable guides 120a, 120b, 122a, 122b. In one embodiment, the powered drive device 118 may include one or more winches sold under the trademark TIRAK®. However, it should be realized that other wire type winches may also be used in the powered drive device 118. The winch systems 120, 122 may each be positioned on a winch platform 128 which may, in turn, be selectively coupled to the track 44 adjacent the first end 78 by way of a first end plate 78a with any suitable fasteners. More specifically, the winch platform 128 may be coupled to the end plate 78a in a first, upper position such that cable guides 120b, 122b of the winch systems 120, 122 may be adjacent upper sheaves 146, 148 provided thereon, or the winch platform 128 may be coupled to the end plate 78a in a second, lower position such that the cable guides 120b, 122b may be adjacent lower sheaves 150, 152 provided thereon. The purpose of such a two-position coupling for the powered drive device 118 will be discussed more fully below. Lifting eyes 128a, 128b may be provided on the winch platform 128 to facilitate raising and/or lowering of the winch platform 128 between the upper and lower positions.

Figure 9:
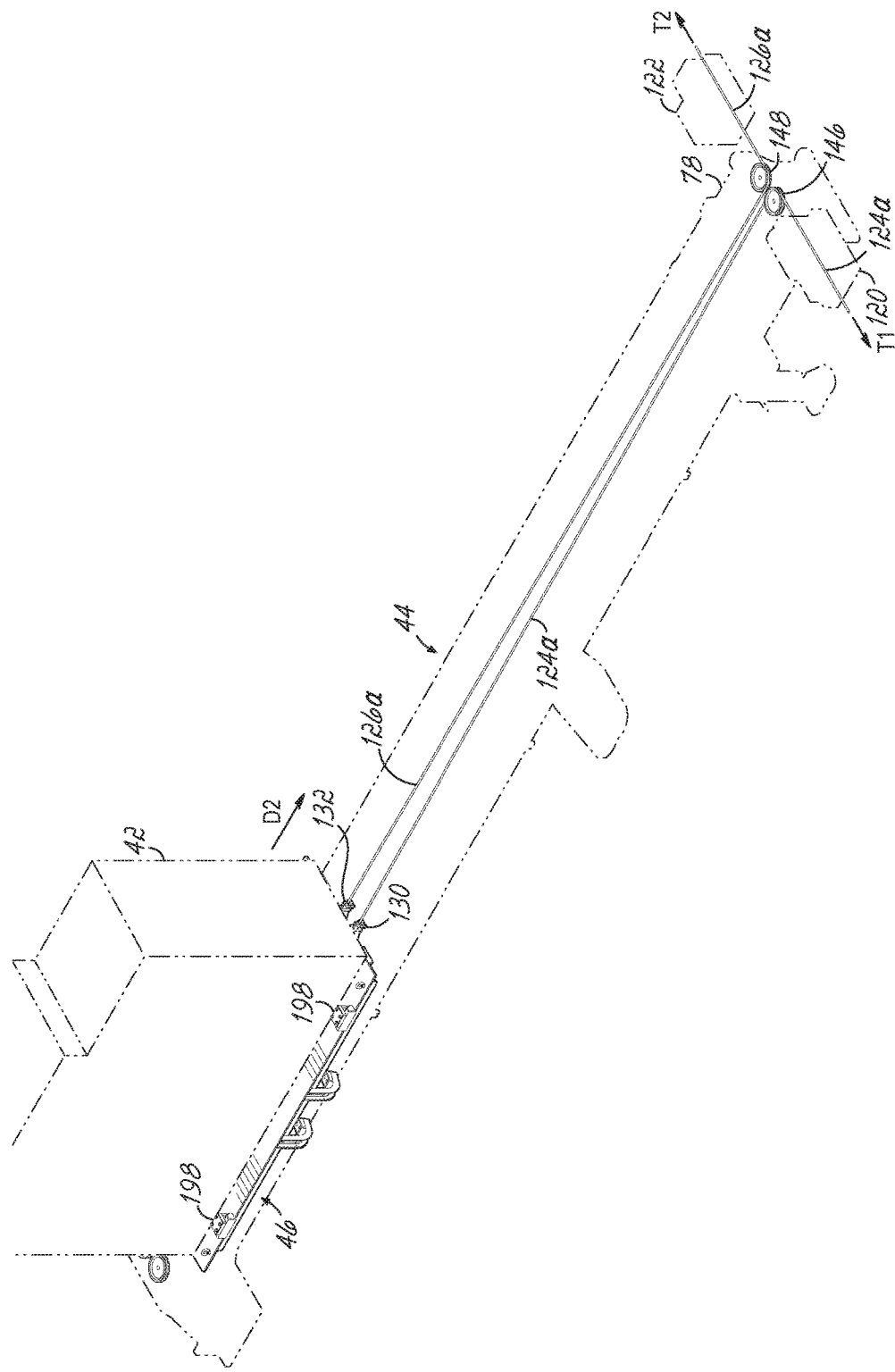
FIG. 9 is a schematic view of a portion of the transport system of FIG. 2 illustrating operation of the powered drive device for moving the component out of the wind turbine.
Figure 10:
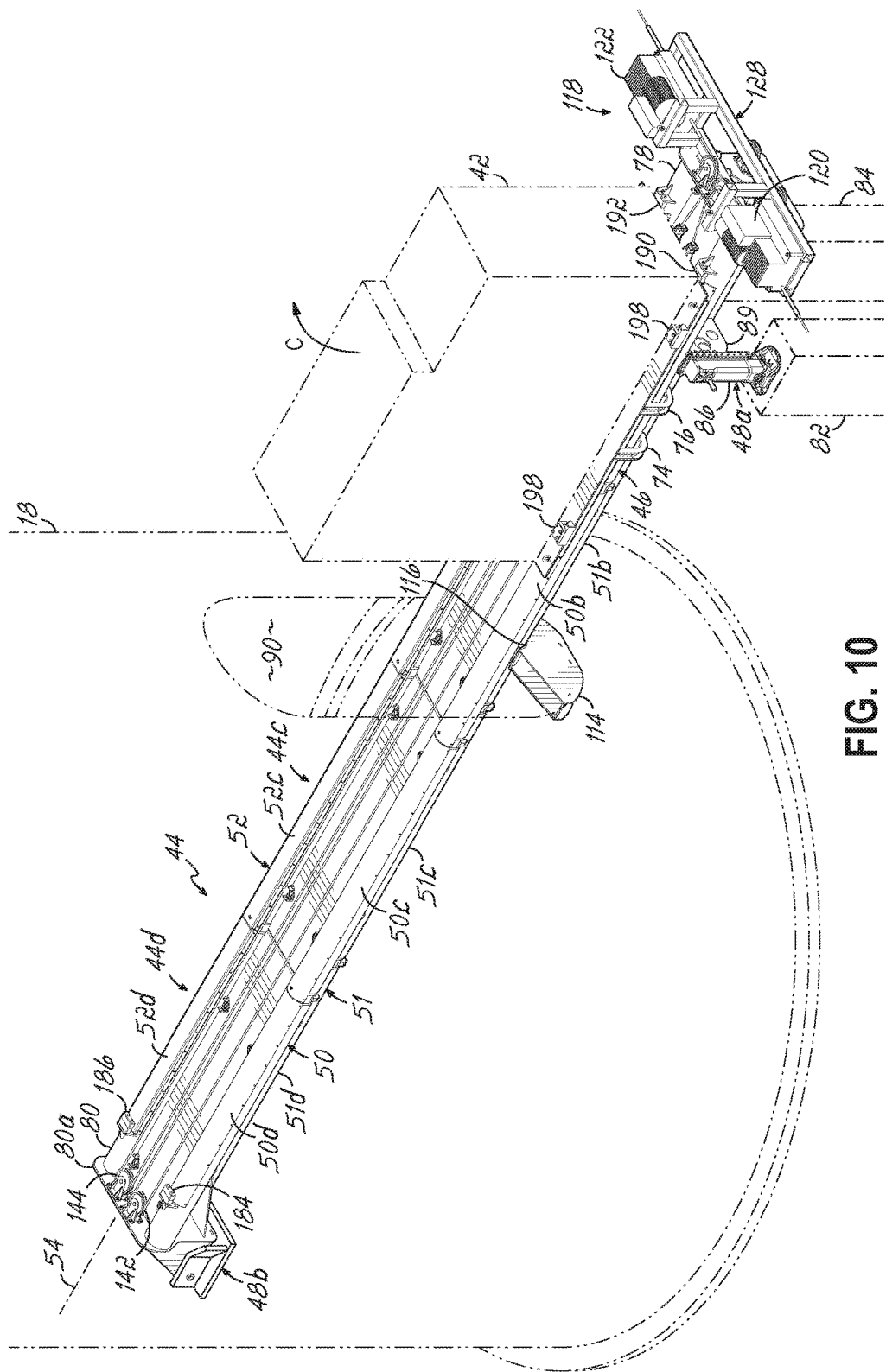
FIG. 10 is a perspective view of a portion of the transport system of FIG. 2 illustrating a position of the component outside the wind turbine.

With the winch platform 128 in the upper position, the feed cables 124a, 126a may be threaded through the upper sheaves 146, 148, respectively. In this position, the feed cables 124a, 126a may be coupled to the carriage 46 such that activation of one or both of the winch systems 120, 122 causes the carriage 46 to move along the track 44 in a desired direction. For example, to move the carriage 46 in a direction from the second end 80 toward the first end 78 (e.g., from inside the tower to outside the tower), the feed cables 124a, 126a may be coupled to cable sockets 130, 132 positioned on a first end 134 of the carriage 46 (FIGS. 9 and 10). To move the carriage 46 in a direction from the first end 78 toward the second end 80 (e.g., from outside the tower to inside the tower), the feed cables 124a, 126a may be coupled to cable sockets 136, 138 positioned on a second end 140 of the carriage 46. In this regard, the feed cables 124a, 126a may be fed below the carriage 46, and the second end 80 of the track 44 may include upper sheaves 142, 144 through which the feed cables 124a, 126a are threaded such that tensioning of the feed cables 124a, 126a (e.g., retraction) causes the desired movement in the carriage 46. The sheaves 142, 144 may be positioned on a second end plate 80a opposing the first end plate 78a of the track 44 so as to be generally aligned with the upper sheaves 146, 148 of the first end plate 78a.

Figure 4A:
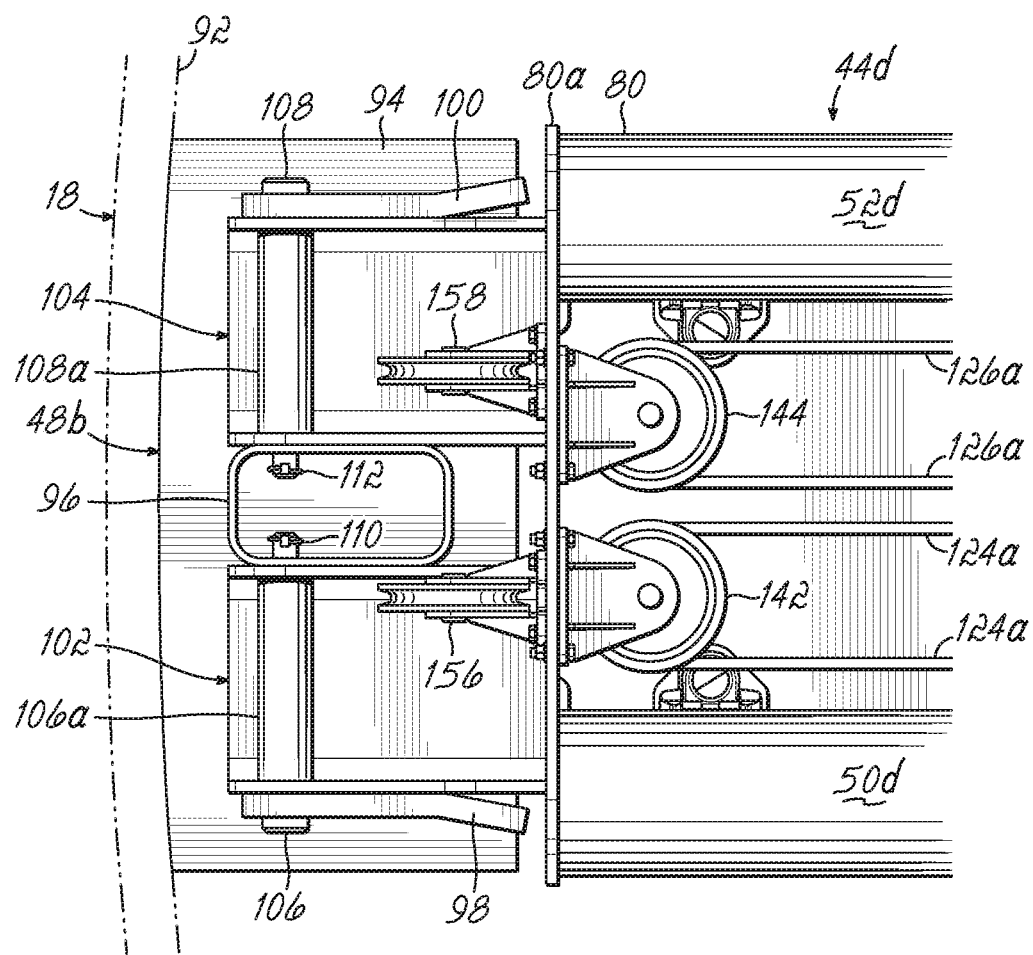
FIG. 4A is a top view of the portion of the transport system of FIG. 4 residing inside the wind turbine tower.
Figure 4B:
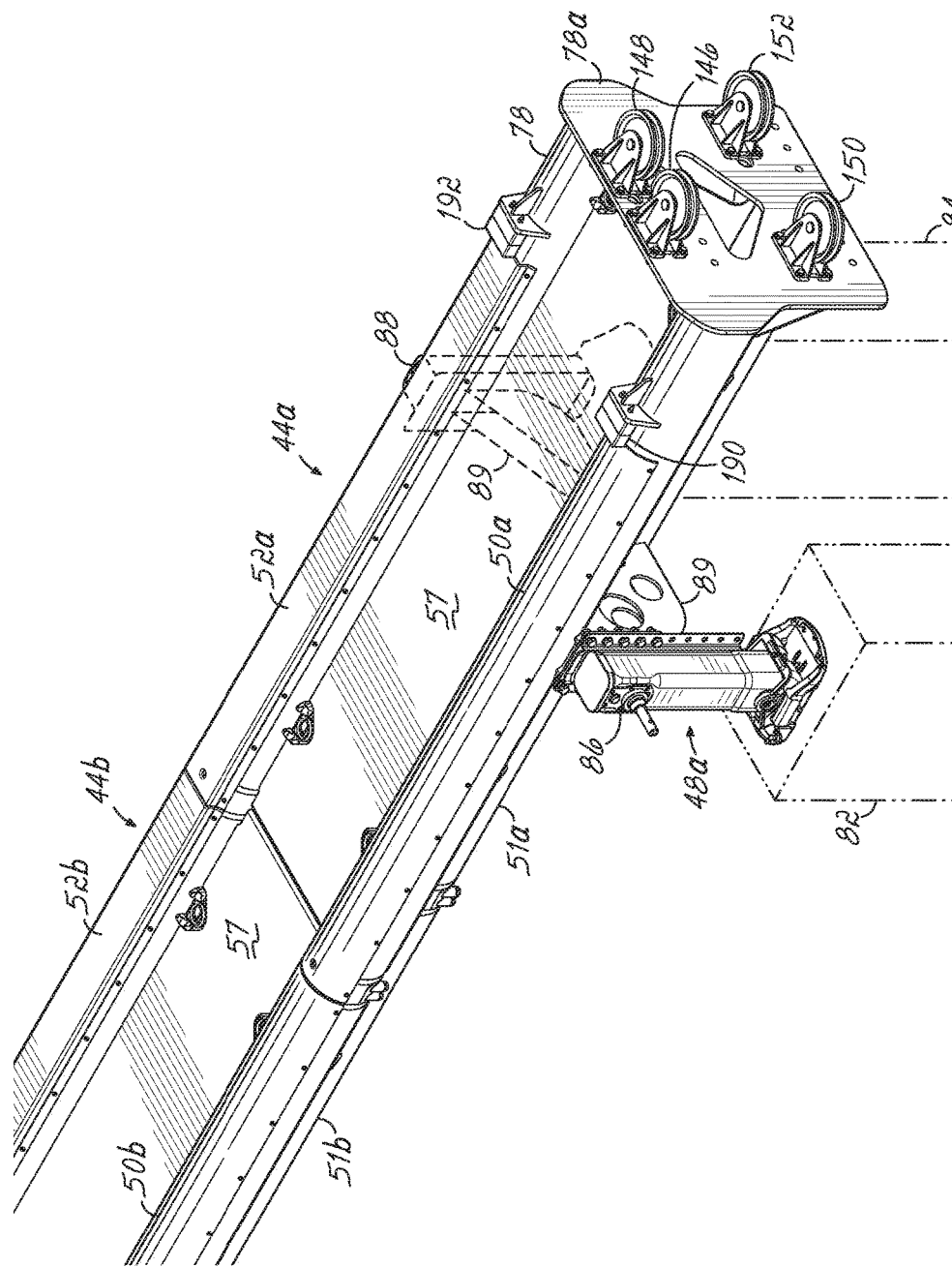
FIG. 4B is a perspective view of the portion of the transport system of FIG. 2 residing outside the wind turbine tower and without the powered drive device coupled thereto.
Figure 4C:
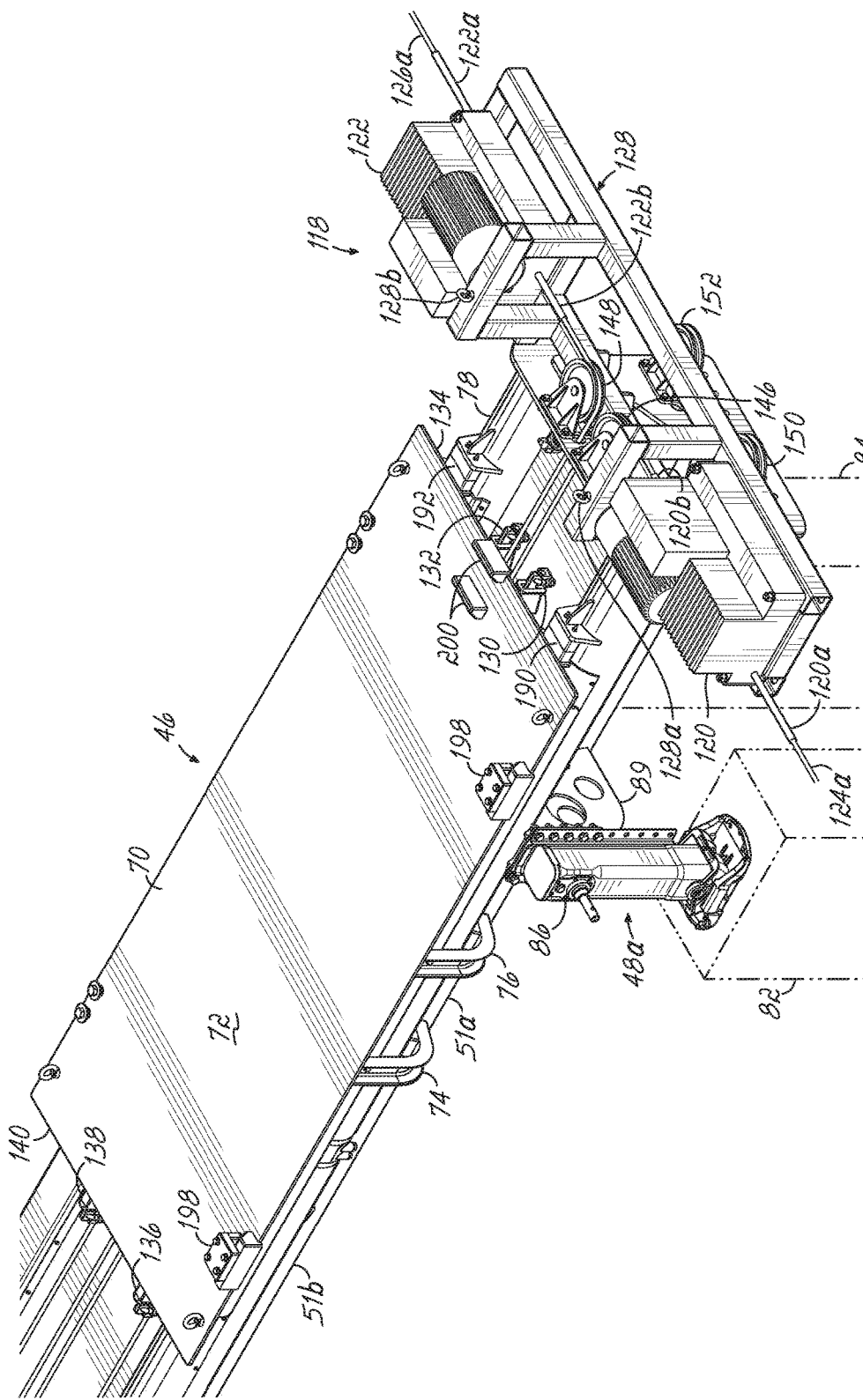
FIG. 4C is a perspective view similar to FIG. 4B illustrating the coupling of the carriage and powered drive device to the transport system.
Figure 6:
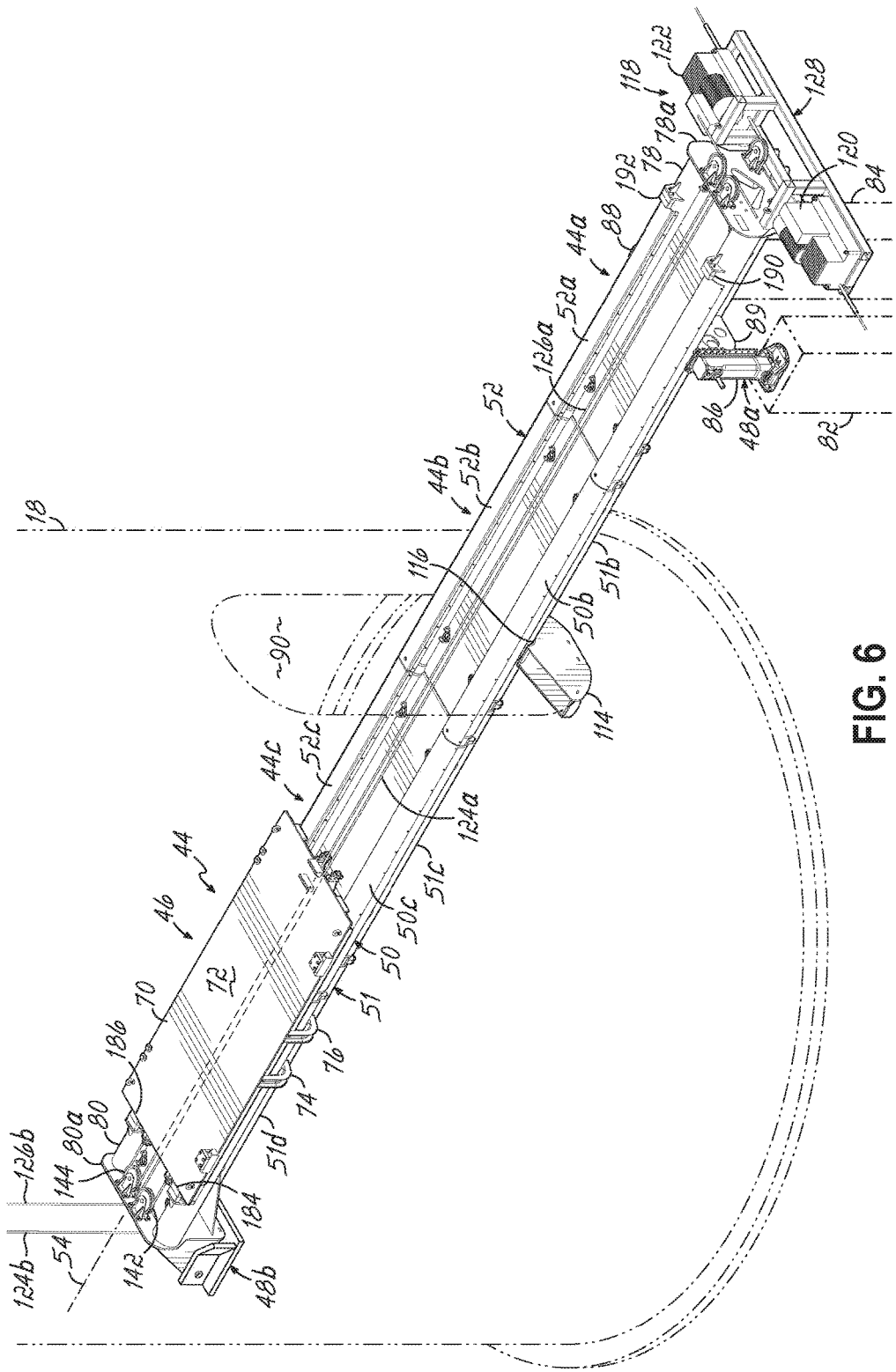
FIG. 6 is a perspective view similar to FIG. 4 illustrating the powered drive device arranged in a lower position for moving the component vertically within the tower.

As noted above, in addition to moving the carriage 46 along the track 44, in an exemplary embodiment the powered drive device 118 may be configured to move the wind turbine component 42 in a vertical direction within the tower 18, thereby eliminating the need for a separate internal winch system. In this regard, the winch platform 128 may be coupled to the first end plate 78a in its lower position, such that feed cables 124b, 126b may be threaded through the lower sheaves 150, 152, respectively, as shown in FIG. 6. As illustrated in FIG. 4A, in one embodiment, corresponding vertically-oriented sheaves 156, 158 may be positioned on an outer surface of the second end plate 80a so as to be aligned with the lower sheaves 150, 152 of the first end plate 78a. In this manner, the feed cables 124b, 126b may be threaded through the lower sheaves 150, 152 to a hoist assembly 160 positioned within the tower 18 above the wind turbine component 42, as shown in FIGS. 6A-6D.

The hoist assembly 160 may include hoist sheaves 162, 164 such that the feed cables 124b, 126b may be threaded through the hoist sheaves 162, 164 to respective tackles 166, 168. The hoist sheaves 162, 164 may be positioned on any suitable pre-existing support beam or truss structure, such as, for example, an I-beam 170 by way of brackets 162a, 164a, respectively. Such support beams for the hoist assembly 160 may be part of the structural framework for the power electronics of the wind turbine. As shown, the tackles 166, 168 may each include upper sheave blocks 166a, 168a, and lower sheave blocks 166b, 168b, respectively. Like the hoist sheaves 162, 164, the upper sheave blocks 166a, 168a may be positioned on any suitable pre-existing support beam or truss structure, such as, for example, an I-beam 172 by way of brackets 166c, 168c, respectively. By positioning the hoist sheaves 162, 164 and the upper sheave blocks 166a, 168a on pre-existing support beams or truss structures, the weight of a load such as, for example, the wind turbine component 42, may be distributed across different portions of the tower wall, thereby reducing the stress concentration at any single portion of the tower wall.

The upper sheave blocks 166a, 168a may each include a cable socket 166d, 168d for coupling an associated feed cable 124b, 126b thereto. Each of the upper and lower sheave blocks 166a, 168a, 166b, 168b includes a plurality of sheaves 174 arranged along a lifting beam in a side-by-side manner for threading the respective feed cables 124b, 126b therethrough. The sheaves 174 may each be of a uniform size and/or shape, or their sizes and shapes may vary, depending on the application. The lower sheave blocks 166b, 168b are suspended below the upper sheave blocks 166a, 168a by way of the feed cables 124b, 126b, and include lifting brackets 176, 178 for coupling to the wind turbine component 42. In the embodiment shown, the lifting brackets 176, 178 each include lifting eyes 180 for receiving slings 182 which may be coupled to the wind turbine component 42.

In one embodiment, one or both of the tackles 166, 168 may include a sensor plate 194 coupled to the upper sheave block 166a, 168a and a breaker plate 196 coupled to the lower sheave block 166b, 168b. The sensor plate 194 may include one or more sensors, such as, for example, optical sensors for detecting the presence of the breaker plate 196. In the event that the lower sheave block 166b, 168b is raised sufficiently close to upper sheave block 166a, the breaker plate 196 may be detected by the sensor, which may communicate with the powered drive device 118 so as to deactivate the winch systems 120, 122 or, alternatively, to initiate an emergency descent of the lower sheave block 166b, 168b.

Use of the transport system 40 will now be described in reference to FIGS. 4-10. When it is desired to remove or replace a wind turbine component 42 of an offshore wind turbine 16, a seafaring vessel will generally be dispatched to facilitate the removal or replacement. Once on site of the wind turbine installation 10, personnel will gain access to the platform 24 and open the door 26 at the base of the tower 18. In this regard, the door 26 may be hinged and simply rotated to an open position to provide opening 90 through the tower wall. Alternatively, the door 26 may be completely removed from the tower 18. Still further, the door 26 and the frame that supports the door 26 may be removed from the tower so as to maximize the opening 90 through the tower wall. Personnel may also place the first support frame 48a on the platform 24 at the desired or predetermined location. In this regard, a crane on board the vessel may be used to move the first support frame 48a to its desired or predetermined location. Alternatively, a smaller, mobile crane on the platform 24 may be used to place the first support frame 48a. Prior to or subsequent to placing the first support frame 48a on the platform 24, the height of the legs 86, 88 may be appropriately adjusted to meet the specific application. Moreover, if the second support frame 48b is not already attached to the inner wall 92 of the tower 18 (e.g., as part of the tower installation), it may be so positioned.

With the opening 90 in the tower wall now accessible, the first support frame 48a positioned on the platform 24, and the second support frame 48b coupled to the inner wall 92 of the tower 18, the track segments 44a, 44b, 44c, 44d may be off-loaded from the vessel. In this regard, the crane on board the vessel may sequentially raise track segments 44a, 44b, 44c, 44d and position the segments relative to the wind turbine 16 such that the second end 80 of the track 44 extends through the opening 90 and into the interior of the tower 18. The track 44 is of an extent that the first end 78 is outside of the tower 18. In this regard, the platform 24 may be sized such that a portion of the platform 24 underlies the first end 78 of the track 44. For example, typical offshore platforms are generally annular structures positioned about the tower 18 and adjacent door 26. In one embodiment, the platform 24 may include an annular portion and an extension portion that extends outwardly from the annular portion in a region adjacent the door 26. The extension portion may provide increased space in the region of the door 26 to allow the wind turbine component 42 to be completely positioned outside of the tower 18 and removed from the wind turbine 16, as will be described below.

In one embodiment, prior to coupling the track segments 44a, 44b, 44c, 44d together, the second end track segment 44d may be positioned so as to be coupled to the second support frame 48b on the inner wall 92 of the tower 18. As noted above, each track segment 44a, 44b, 44c, 44d may then be coupled by way of associated male and female couplers 59, 61 with collars 63 so as to form the track 44. If necessary, the height of the first support frame 48a may be varied to support the track 44 on the platform 26. In one embodiment, a door support bracket 114 may be positioned over a bottom edge of the opening 90 in the tower wall, and the support rail 51 may be configured to engage the door support bracket 114 to further support the track 44. In an alternative embodiment, however, the support rail 51 may be configured to be spaced from the edge of the opening 90. In a still further embodiment, the support rail 51 may be configured to engage the edge of the opening 90 directly.

To further assemble the transport system 40, the carriage 46 may be placed relative to the rails 50, 52. For example, the carriage 46 may be threaded over the first end 78 of the rails 50, 52 such that the bearing pads or rollers, described above, engage the rails 50, 52. Thus, the carriage 46 is coupled to the rails 50, 52 and movable therealong in directions generally parallel to the longitudinal axis 54. The powered drive device 118 may then be coupled to the transport system 40. Depending on the particular embodiment, as discussed above, this may entail coupling the winch platform 128 in either the upper or lower position, adjacent the first end 78. Additionally, the ends of the feed cables 124a, 126a may be threaded through the appropriate sheaves and coupled to the carriage 46 to facilitate movement of the carriage 46 along the track 44.

As an alternative to the above, much of the transport system 40 may be pre-assembled before being lifted onto the platform 24, such as on the vessel. In this regard, the track segments 44a, 44b, 44c, 44d may be coupled together before being positioned relative to the wind turbine 10. Additionally, the carriage 46 and the winch platform 128 may be coupled to the rails 50, 52 to form an assembly which is then lifted onto the platform 24 using the crane. To position the transport system 40 relative to the tower 18, the vessel crane may position the assembly such that the second ends 80 of the rails 50, 52 are positioned inside the tower 18. The track 44 may then be coupled to the inner wall 92 of the tower 18, as discussed above. Those of ordinary skill in the art may recognize additional or alternative combinations for assembling the transport system 40 and positioning the transport system 40 relative to the wind turbine 16.

As illustrated in FIG. 4, for a removal procedure, the carriage 46 may be initially positioned outside of the tower 18, such as, for example, adjacent the first end 78. As shown, the feed cables 124a, 126a of the winch systems 120, 122 may be coupled to the carriage 46 such that activation of the winch systems causes the carriage 46 to move from outside the tower 18 to inside the tower 18. As noted above, this may include coupling the winch platform 128 in its upper position and threading the feed cables 124a, 126a about upper sheaves 146, 148 adjacent the first end 78 of the track 44 and upper sheaves 142, 144 adjacent the second end 80 of the track, and coupling the feed cables to cable sockets 136, 138, respectively.

Figure 5A:
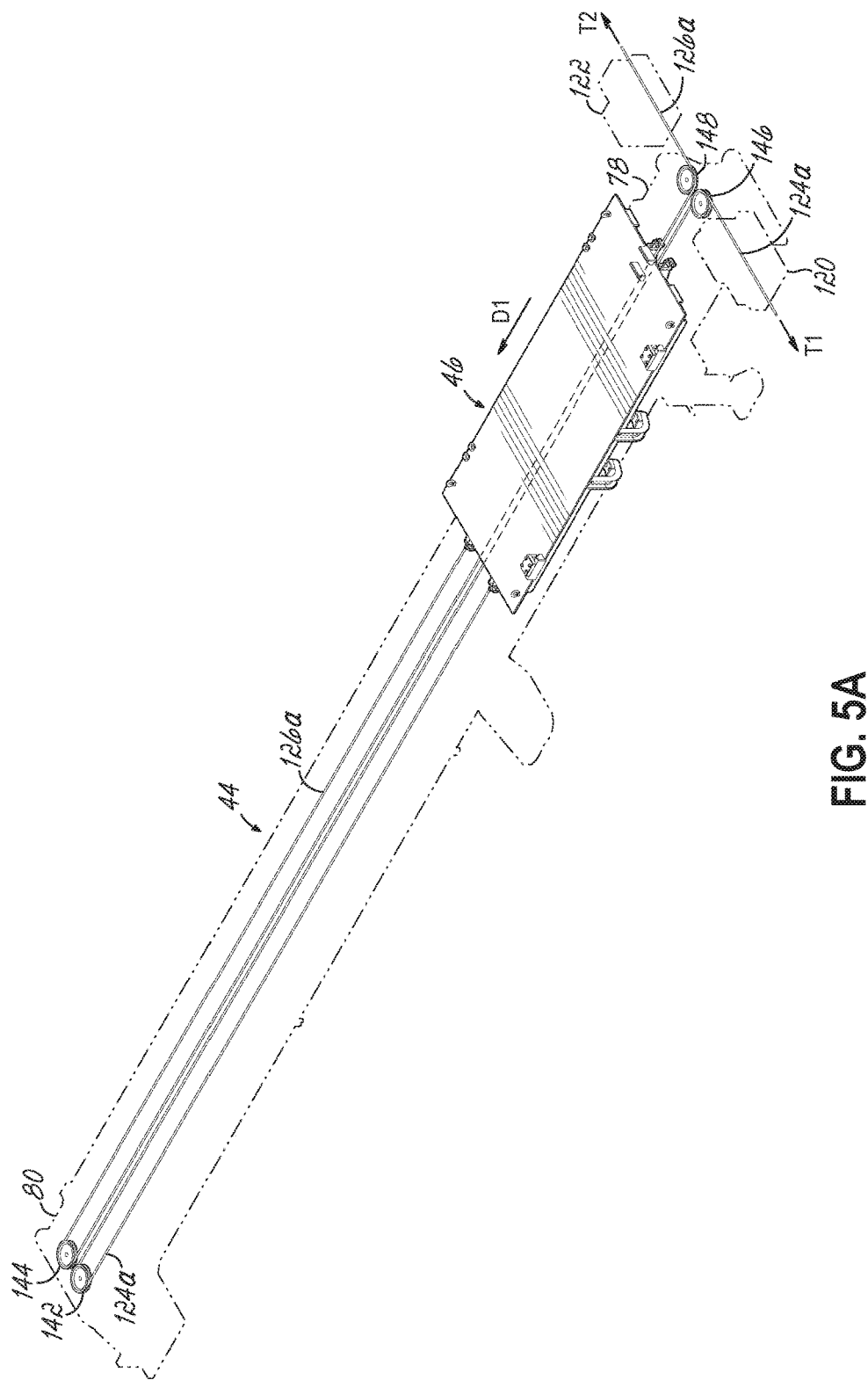
FIGS. 5A and 5B are schematic views of the transport system of FIG. 2 illustrating operation of the powered drive device for moving the carriage along the track.
Figure 5B:
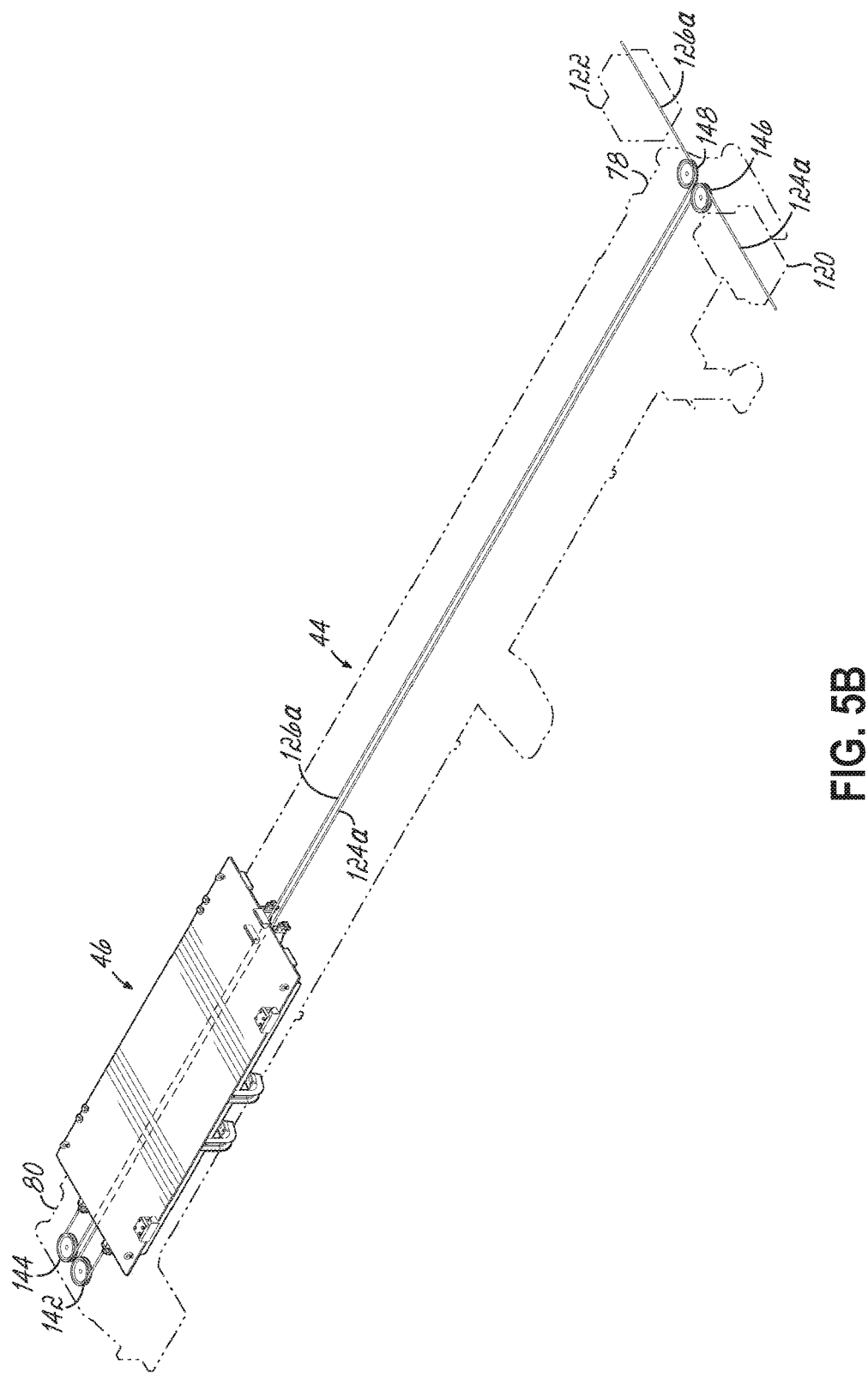

As shown in FIG. 5A, the winch systems 120, 122 may then be activated such that the feed cables 124a, 126a are tensioned in the directions indicated by arrows T1 and T2, respectively, thereby causing the carriage 46 to move along the track 44 in the direction indicated by arrow D1. In this manner, the carriage 46 may be moved from outside the tower 18 toward the second end 80 of the track 44 inside the tower 18 and through the opening 90 in the tower wall. As shown in FIG. 5B, the winch systems 120, 122 may be deactivated when the carriage 46 is positioned adjacent the second end 80 or at another desirable position inside the tower 18. As shown in FIG. 6, bumpers or end stops 184, 186 may be provided at or near the second ends 80 of the rails 50, 52 to provide a positive stop for the carriage 46. In one embodiment, the end stops 184, 186 may be positioned so as to generally align the carriage 46 with the above wind turbine component 42.

With the carriage 46 positioned adjacent the second end 80, the winch platform 128 may be uncoupled from the first end plate 78a at its upper position and coupled to the first end plate 78a at its lower position, as shown in FIG. 6. As shown, the feed cables 124a, 126a may remain coupled to the carriage 46 and additional feed cables 124b, 126b may be loaded into the winch systems 120, 122. In this manner, at least a portion of the feed cables 124a, 126a may be held in tension by a locking clamp (not shown) so as to lock the carriage 46 in place. Alternatively, the feed cables 124a, 126a may be uncoupled from the carriage 46 and used in place of the additional feed cables 124b, 126b, to reduce the number of required feed cables.

In any event, the feed cables 124b, 126b may be coupled to the tackles 166, 168 such that activation of the winch systems 120, 122 causes the lower sheave blocks to move in a vertical direction. As noted above, this may include threading the feed cables 124b, 126b about lower sheaves 150, 152 adjacent the first end 78 of the track 44, lower sheaves 156, 158 adjacent the second end 80 of the track, hoist sheaves 162, 164, and sheaves 174, and coupling the feed cables to cable sockets 166d, 168d, respectively. In this manner, the winch systems 120, 122 may then be activated to either pay out or pay in the feed cables 124b, 126b, respectively.

Figure 6A:
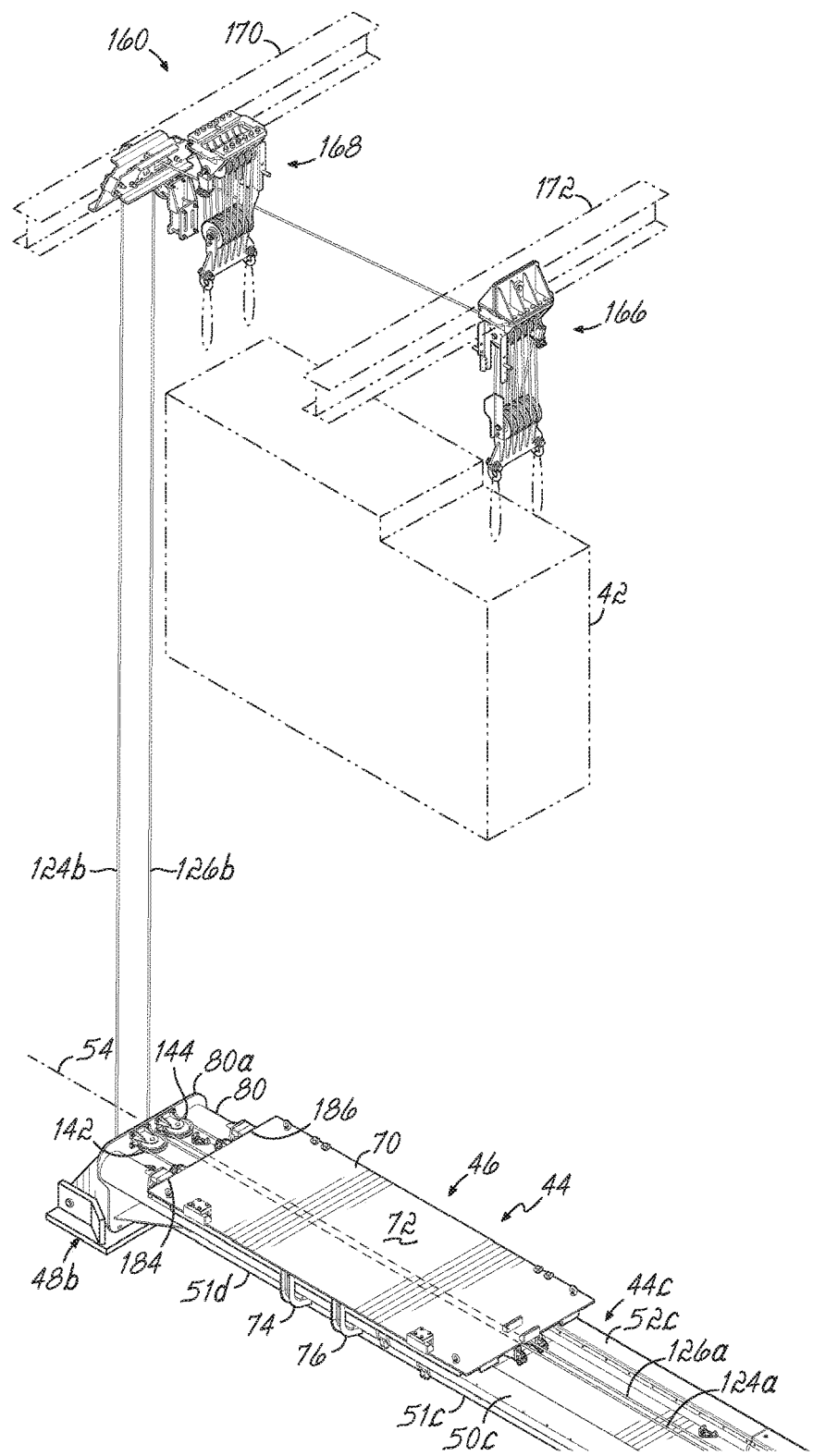
FIG. 6A is another perspective view of the portion of the transport system of FIG. 2 residing inside the wind turbine tower and illustrating the hoist assembly.
Figure 6B:
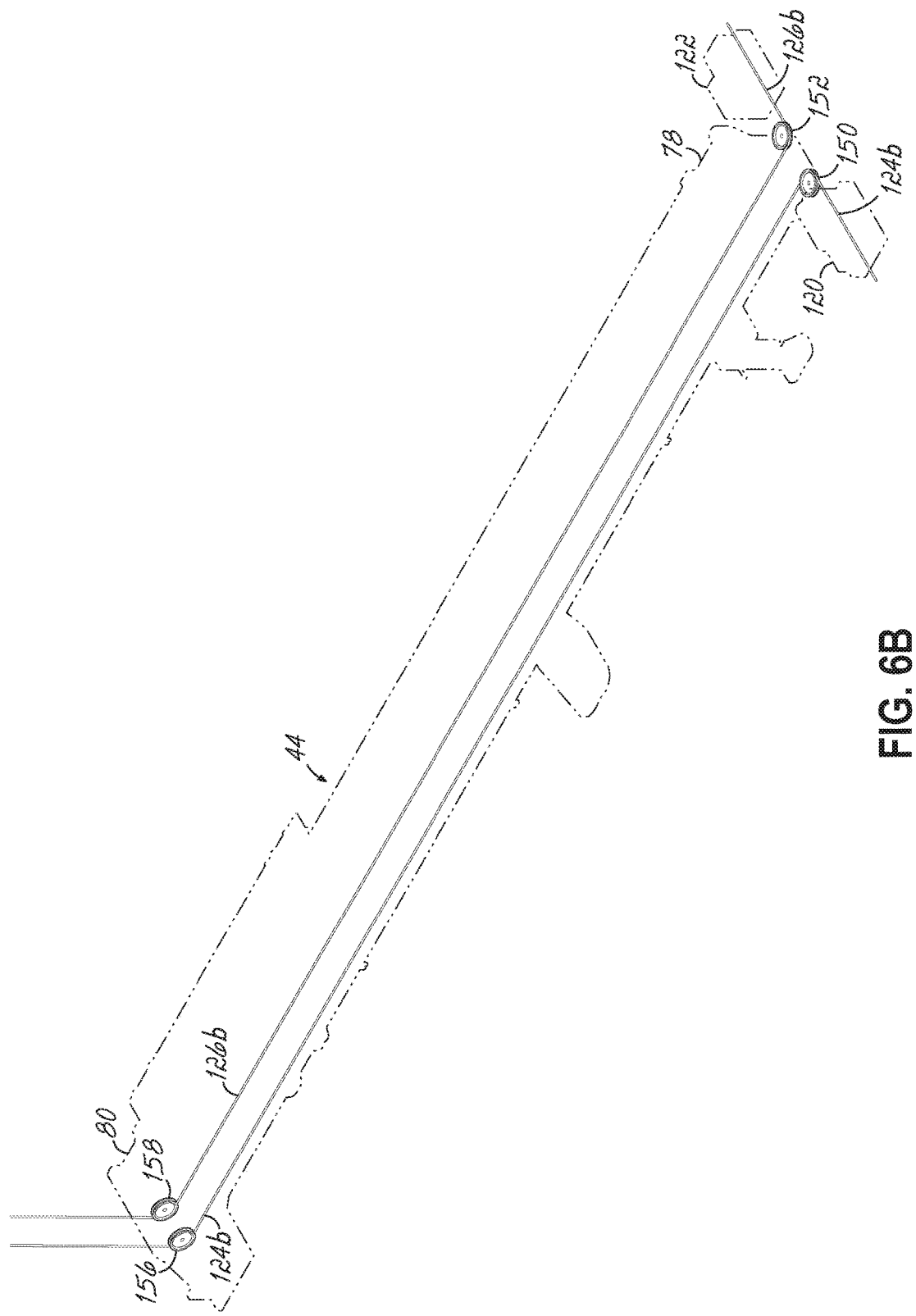
FIGS. 6B-6D are schematic views of portions of the transport system of FIG. 6 illustrating operation of the powered drive device for moving the component vertically within the tower.
Figure 6C:
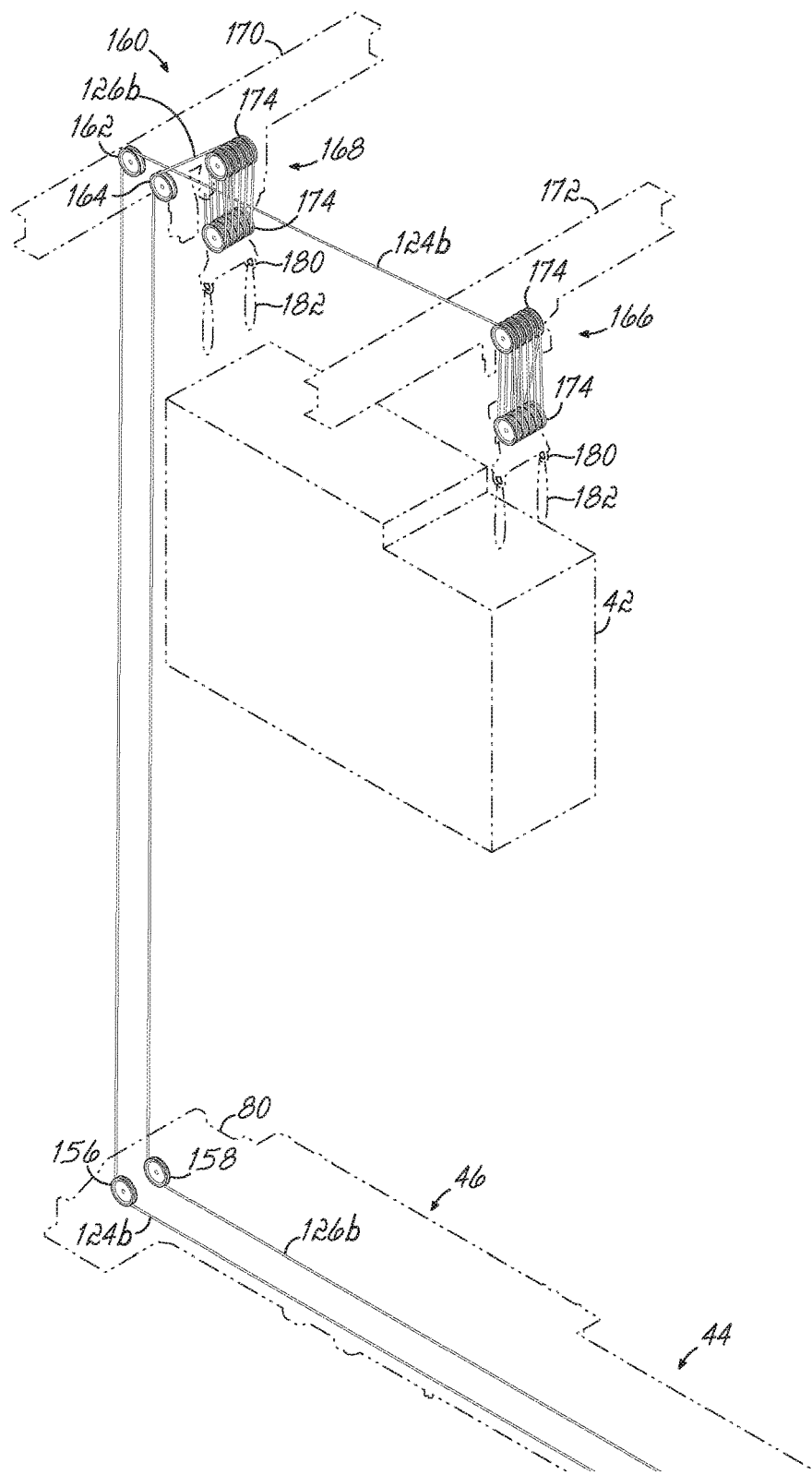
Figure 6D:
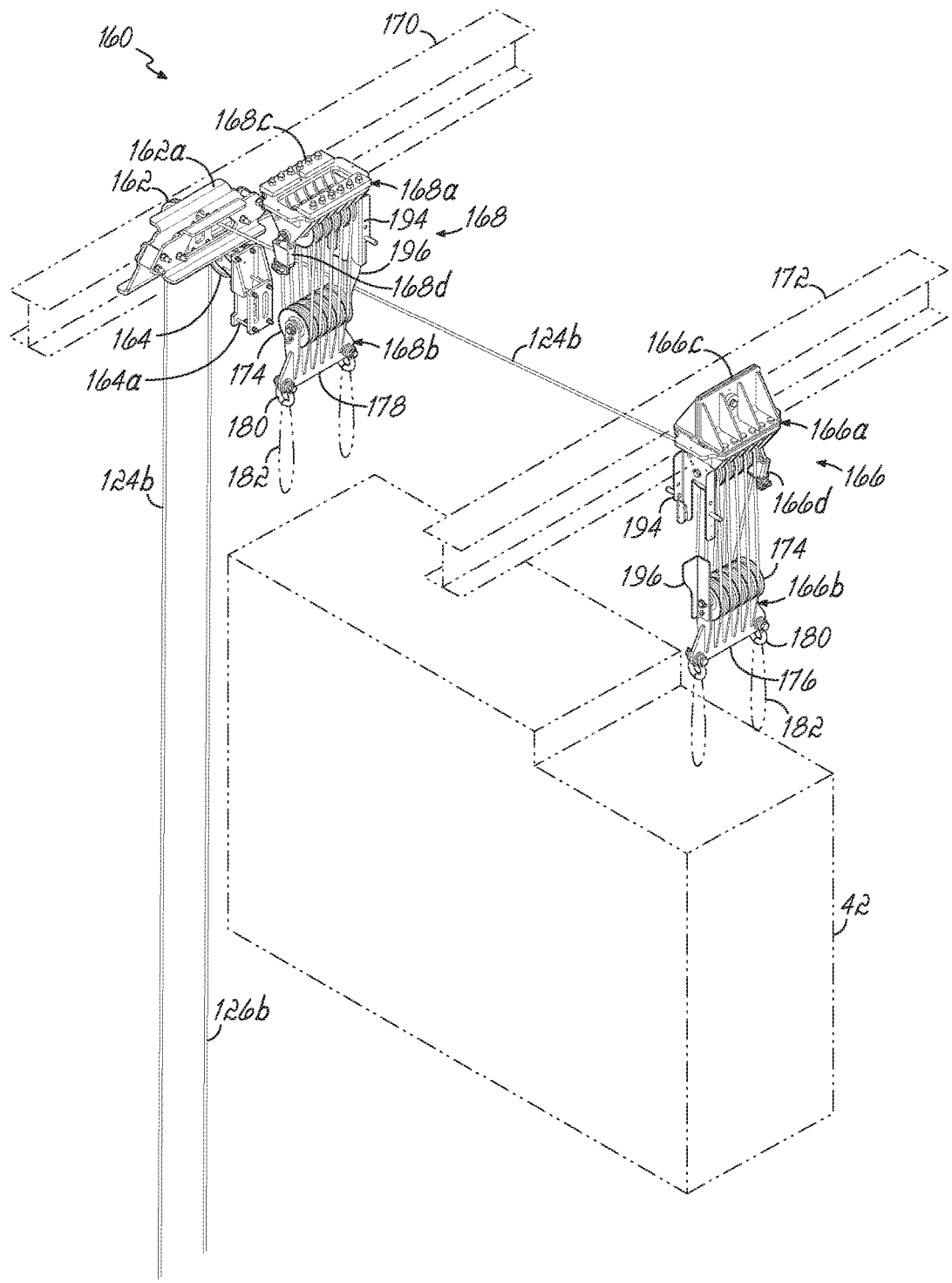
Figure 7:
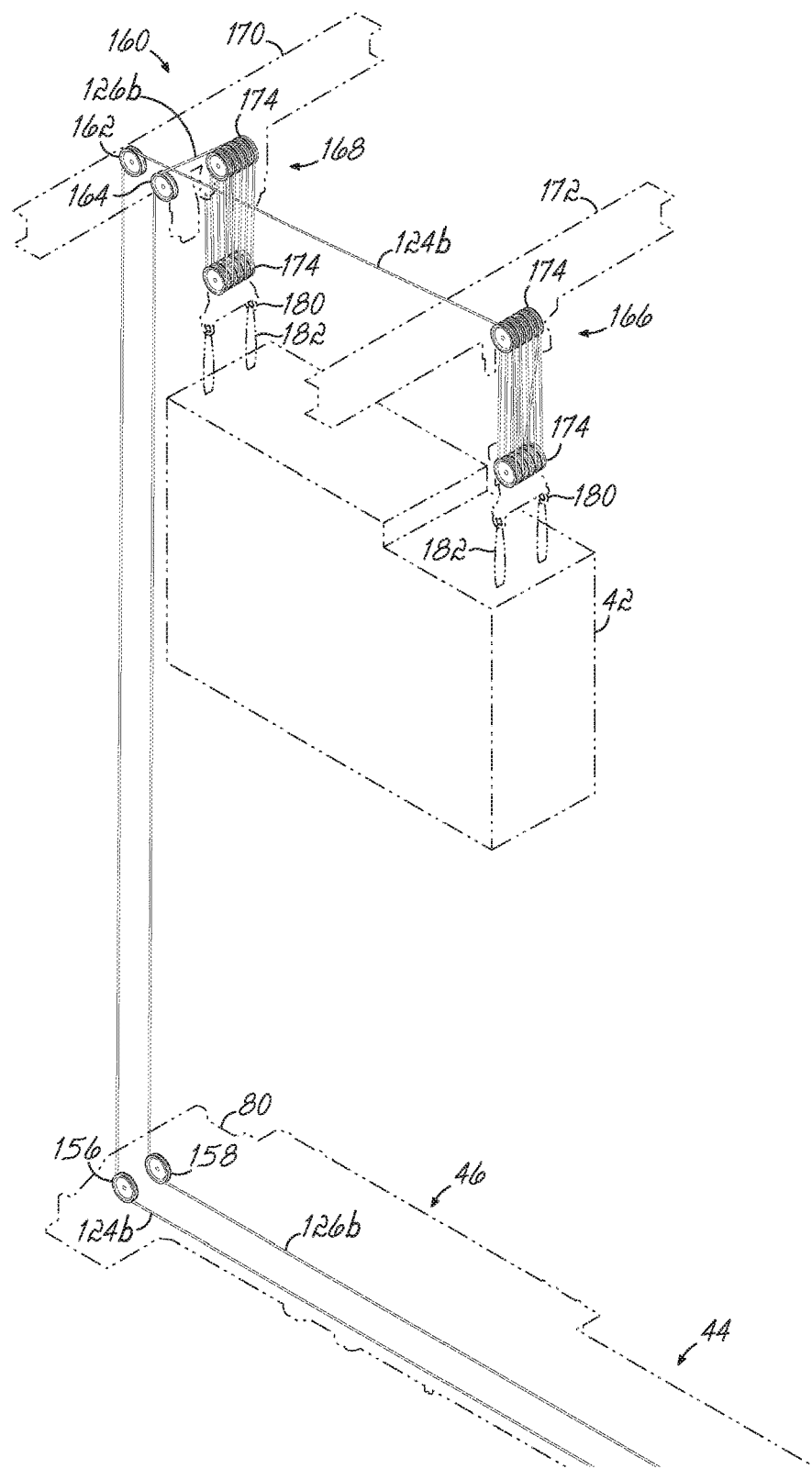
FIG. 7 is a schematic view of a portion of the transport system of FIG. 2 illustrating a wind turbine component in a vertically raised position.

Paying out the feed cable 124b, 126b allows the lower sheave blocks 166b, 168b to be lowered from a position shown in FIG. 6C to a position proximate the wind turbine component 42, such as the position shown in FIG. 7, in a controlled manner. As noted above, slings 182 may be coupled to the wind turbine component 42, such as by, for example, shackles positioned on a top surface of the component (not shown). With the lower sheave blocks 166b, 168b proximate the wind turbine component 42, the slings 182 may also be coupled to lifting brackets 176, 178 of the sheave blocks by way of lifting eyes 180, as shown in FIG. 7. In this manner, the wind turbine component 42 may be coupled to the hoisting assembly 160 such that operation of the winch systems 120, 122 may raise and/or lower the component 42 in a controlled manner. However, it will be appreciated that the wind turbine component 42 may be coupled to the hoisting assembly 160 in any suitable manner.

In one embodiment, the wind turbine component 42 may be disposed on a platform (not shown) generally positioned above the door opening 90 within the tower 18. The winch systems 120, 122 may be activated so as to lift the wind turbine component 42 off the platform. With the component 42 lifted off the platform, at least part of the platform may be moved to provide an opening (not shown) that allows the component 42 to pass the platform and access the region under the platform, including the opening 90 in the tower wall. For example, the opening in the platform may be formed by sliding, hinging, or removing a closure, such as a panel, door, hatch, etc. The size of the opening (and thus the closure) must be such that the wind turbine component 42 may pass therethrough. Those of ordinary skill in the art may recognize other ways to move or arrange the platform to allow the wind turbine component 42 to pass.

Figure 7A:
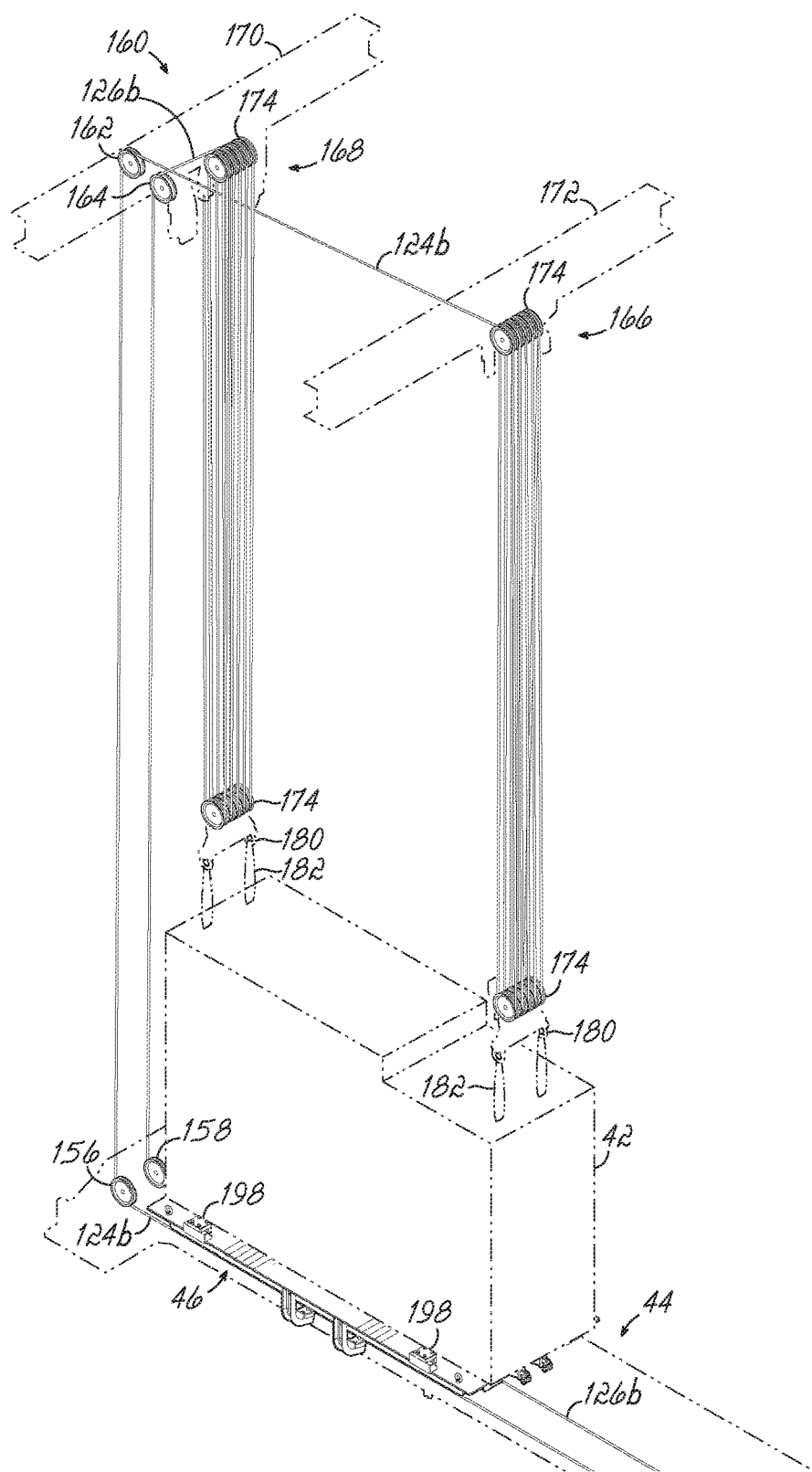
FIG. 7A is a schematic view of a portion of the transport system similar to FIG. 7, but with the wind turbine component in a vertically lowered position.
Figure 7B:
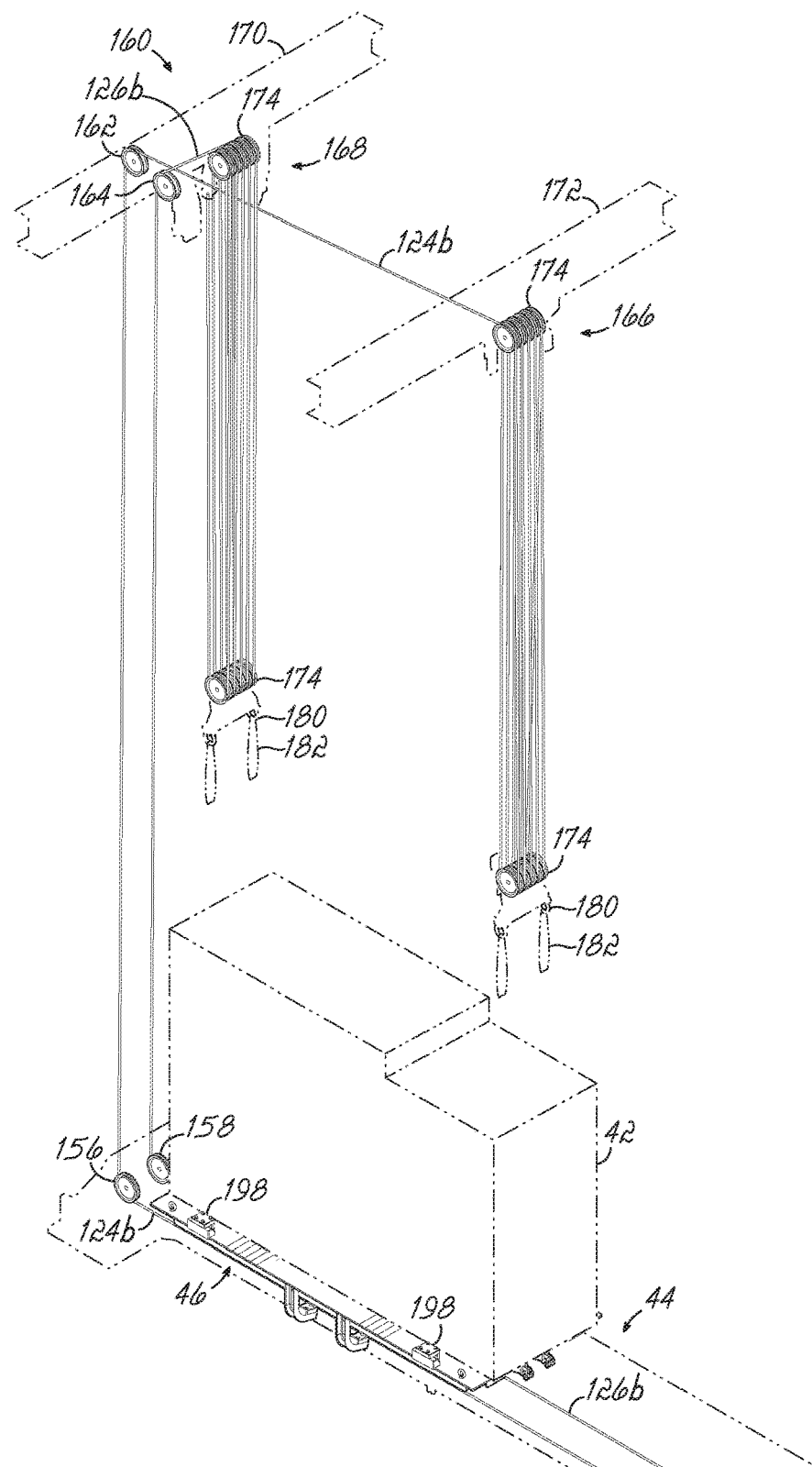
FIG. 7B is a schematic view of a portion of the transport system of FIG. 2 illustrating positioning the component on the carriage.

With the closure in the open position, the winch systems 120, 122 may be activated so as to lower the wind turbine component 42 through the opening in the platform and on to the carriage 46 positioned so as to be in alignment with the opening, as illustrated in FIG. 7A. In one embodiment, the wind turbine component 42 may be coupled to the carriage 46 so as to prevent the component 42 from falling off of, or otherwise moving with respect to the carriage 46. For example, the wind turbine component 42 may be bolted and/or mechanically locked to the carriage 46 by various side clamps 198 and guide shoes 200, depending on the size of the component 42 and the particular application.

Figure 8:
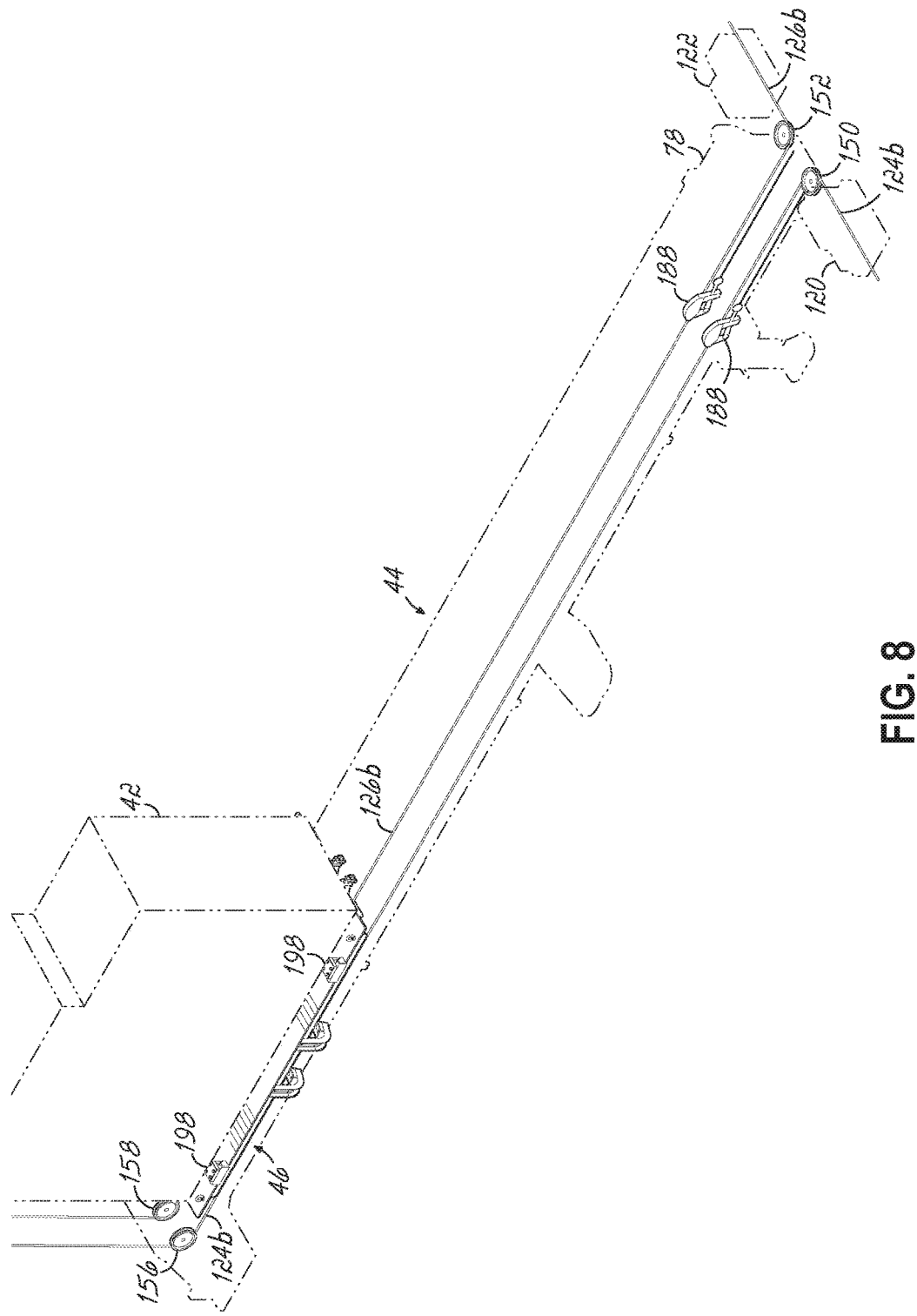
FIG. 8 is a schematic view of a portion of the transport system of FIG. 2 with the component ready for movement along the track.

With the wind turbine component 42 positioned on the carriage 48, the hoisting assembly 160 may be disengaged from the component 42. For example, the slings 182 may be disconnected from the component 42, and the winch systems 120, 122 may be activated to raise the lower sheave blocks 166b, 168b so as to provide clearance over the component 42. During a replacement operation, it may be advantageous to maintain the hoisting assembly 160 in such a position so as to be ready for coupling to a replacement component (not shown). Therefore, as illustrated in FIG. 8, locking clamps 188 may be positioned along the feed cables 124b, 126b and clamped thereover so as to hold at least a portion of the feed cables 124b, 126b in tension, thereby locking the hoisting assembly 160 in place. The feed cables 124b, 126b may then be dislodged from the winch systems 120, 122 and the winch platform removed from its lower position without disrupting the hoisting assembly 160.

Next, as illustrated in FIG. 9, the feed cables 124a, 126a may be coupled to the cable sockets 130, 132 and the winch platform coupled to the first end plate 78a in its upper position. The winch systems 120, 122 may be activated such that the feed cables are tensioned in the directions indicated by arrows T1 and T2, respectively, thereby causing the carriage 46 to move along the track 44 in the direction indicated by arrow D2. In this manner, the carriage 46 carrying the wind turbine component 42 moves along the track 44 from inside the tower 18 toward the first end 78 of the track 44 outside of the tower 18 and through opening 90 in the tower wall. As noted above, the track 44 and platform 24 are configured such that the wind turbine component 42 may be completely positioned outside of the tower 18. As shown in FIG. 10, bumpers or end stops 190, 192 may be provided at or near the first ends 78 of the rails 50, 52 to provide a positive stop for the carriage 46. With the wind turbine component 42 positioned completely outside of the tower 18, the component 42 may be uncoupled from the carriage 46. The crane on the vessel may be used to lift the component 42 off the carriage 46 and away from the wind turbine 16, such as, for example, in a direction indicated by arrow C.

Another wind turbine component, such as a replacement transformer or other replacement component (not shown), may be carried by the vessel and may be coupled to the vessel crane and lifted up to the platform 24. More specifically, the vessel crane may be used to place the replacement component on the carriage 46, which is positioned outside of the tower 18. Either prior to or subsequent to the replacement component being positioned on the carriage 46, the feed cables 124a, 126a of the winch systems 120, 122 may be coupled to the cable sockets 136, 138 of the carriage 46 such that activation of the winch systems causes the carriage 46 to move from outside the tower to inside the tower, as previously described. The winch systems 120, 122 may be activated such that the carriage 46 carrying the replacement component moves along track 44 from outside the tower 18 toward the second end 80 of the track 44 inside the tower 18 and through opening 90 in the tower wall. The carriage 46 may be positioned so as to generally align with the previously described opening in the platform.

From here, the hoisting assembly 160 may be coupled to the replacement component, such as, for example, in a manner similar to that previously described with the prior component 42. The winch platform 128 may be moved to the lower position, and the winch systems 120, 122 activated so as to lift the replacement component vertically off of the carriage 46 and through the opening in the platform so that the replacement component is above the platform. Next, the closure may be moved back to its closed position over the opening and the winch systems 120, 122 activated so as to lower the replacement component onto the platform. The hoisting assembly 160 may then be disengaged from the replacement component. Once physically positioned, various personnel may then take the necessary steps to integrate the replacement component into operation with wind turbine 16. As that process forms no part of the present invention, it will not be described in any further detail herein.

With the prior wind turbine component 42 being removed and the replacement component positioned within wind turbine 16, the transport system 40 may be disassembled. In this regard, the feed cables 126a, 126b may be disengaged from the carriage 46 and the winch platform 128 may be removed from the first end plate 78a. The carriage 46 may then be removed from the track 44, such as at first end 78. Next, the track segments 44a, 44b, 44c, 44d may be uncoupled from each other and from any other components, such as second support frame 48b and doorframe support bracket 118, and removed from the wind turbine 16 using the vessel crane. If the second support frame 48b is removable from the inner wall 92 of the tower 18, it may also be removed from the platform 24. If the second support frame 48b is not intended to be removed, then it is left in place on the inner wall 92 of the tower 18 to be used at a later date. Alternatively, and similar to the above, the rails 50, 52, carriage 46, and powered drive device 118 may be removed as an assembly using the crane, for example.

While the present invention has been illustrated by a description of various preferred embodiments and while these embodiments have been described in some detail, it is not the intention of the inventors to restrict or in any way limit the scope of the appended claims to such detail. Additional advantages and modifications will readily appear to those skilled in the art. For example, while the transport systems above have been described for use with offshore wind turbine installations, the transport systems may also be used for onshore wind turbine installations as well. In this regard, the foundation or ground surrounding the wind turbine tower may serve the same function as the platform as described above. Thus, the various features of the invention may be used alone or in any combination depending on the needs and preferences of the user.

What is claimed is:

1. A method for moving a wind turbine component relative to a wind turbine having a tower with a door for closing off an opening through the tower, the method comprising:
   providing a transport system having a track with a first end and a second end, a powered drive device coupled to the first end of the track, and one or more feed cables operatively coupled to the powered drive device;
   removably positioning the transport system relative to the wind turbine such that the first end of the track is positioned outside the tower, the second end of the track is positioned inside the tower, and the track extends through the opening in the tower, the transport system configured to facilitate movement of the wind turbine component between an inside of the tower and an outside of the tower through the opening;
   operatively coupling the one or more feed cables to the wind turbine component; and
   moving the wind turbine component vertically within the tower away from or toward the track using the powered drive device of the transport system.

2. The method according to claim 1, further comprising:
   removably coupling a hoist assembly to a support structure of the tower above the opening in the tower and above the wind turbine component, the hoist assembly including a plurality of sheaves;
   operatively coupling the hoist assembly and the powered drive device via the one or more feed cables;
   operatively coupling the hoist assembly to the wind turbine component; and
   activating the powered drive device to move the wind turbine component vertically within the tower.

3. The method according to claim 2, wherein operatively coupling the hoist assembly and the powered drive device further comprises extending the one or more of the feed cables through one or more sheaves at the second end of the track.

4. The method according to claim 1, further comprising using the powered drive device of the transport system to move the wind turbine component along the track and through the opening in the tower.

5. The method according to claim 4, wherein the powered drive device is selectively coupleable to the transport system in a first or second position, the method further comprising:
   coupling the powered drive device to the transport system in the first position when moving the wind turbine component vertically within the tower; and
   coupling the powered drive device to the transport system in the second position when moving the wind turbine component along the track.

6. The method of claim 1, wherein the track is modular and the method further comprises assembling the track by coupling a plurality of track segments in an end-to-end fashion.

7. The method according to claim 1, wherein the method is used for removing the wind turbine component from the wind turbine, the method further comprising:
   removably coupling a hoist assembly to a support structure of the tower above the opening in the tower and above the wind turbine component, the hoist assembly including a plurality of sheaves;
   operatively coupling the hoist assembly and the powered drive device via the one or more feed cables;
   activating the powered drive device to vertically raise the component off a platform located within the tower and above the door;
   activating the powered drive device to vertically lower the component onto the track;
   moving the wind turbine component along the track from inside the tower to outside the tower such that the wind turbine component is completely positioned outside the tower; and
   removing the wind turbine component from the track.

8. The method according to claim 7, further comprising installing another wind turbine component into the wind turbine tower, comprising:
   positioning the another wind turbine component on the track;
   moving the another wind turbine component along the track from outside the tower to inside the tower;
   activating the powered drive device to vertically raise the another wind turbine component off the track and above the platform; and
   activating the powered drive device to vertically lower the another wind turbine component onto the platform.

9. The method according to claim 7, wherein moving the wind turbine component along the track further comprises:
   operatively coupling the powered drive device to the wind turbine component via the one or more feed cables; and
   activating the powered drive device to move the wind turbine component along the track.

10. The method according to claim 8, wherein moving the another wind turbine component along the track further comprises:
    operatively coupling the powered drive device to the another wind turbine component via the one or more feed cables; and
    activating the powered drive device to move the another wind turbine component along the track.

11. The method according to claim 7, wherein the powered drive device is selectively coupleable to the transport system in a first or second position, the method further comprising:
    coupling the powered drive device to the transport system in the first position when moving a wind turbine component vertically within the tower; and
    coupling the powered drive device to the transport system in the second position when moving a wind turbine component along the track.

12. The method according to claim 1, further comprising manually moving the wind turbine component along the track and through the opening in the door.

13. A transport system for moving a wind turbine component into or out of a wind turbine having a tower with a door for closing off an opening through the tower, the transport system comprising:
    a track having a first end configured to be positioned outside of the tower and a second end configured to be coupled to an inner wall of the tower such that the track extends through the opening in the tower;
    a carriage configured to be movably coupled to the track and further configured to receive the wind turbine component thereon for movement of the wind turbine component into or out of the wind turbine through the opening;

a powered drive device configured to be coupled to the first end of the track;
one or more feed cables operatively coupled to the powered drive device; and
a hoist assembly configured to be coupled to a support structure of the tower above the opening in the tower and above the wind turbine component, the hoist assembly including a plurality of sheaves,
wherein when the transport system is assembled and installed relative to the wind turbine, the powered drive device is configured to be operatively coupled to the wind turbine component via the hoist assembly and the one or more feed cables and operable to move the wind turbine component vertically within the tower and away from or toward the track.

14. The transport system according to claim 13, further comprising one or more sheaves coupled to the track adjacent the second end for guiding the one or more feed cables from the powered drive device to the hoist assembly.

15. The transport system according to claim 14, further comprising one or more sheaves coupled to the track adjacent the first end for guiding the one or more feed cables from the powered drive device toward the one or more sheaves at the second end of the track.

16. The transport system according to claim 13, wherein the powered drive device is configured to be operatively coupled to the carriage via the one or more feed cables and operable to move the wind turbine component along the track.

17. The transport system according to claim 16, further comprising one or more sheaves coupled to the track adjacent the second end for guiding the one or more feed cables from the powered drive device to the carriage.

18. The transport system according to claim 17, further comprising one or more sheaves coupled to the track adjacent the first end for guiding the one or more feed cables from the powered drive device toward the one or more sheaves at the second end of the track.

19. The transport system according to claim 16, wherein the powered drive device is selectively coupleable to the track in a first position and a second position, the powered drive device configured to be coupled to the track in the first position when moving the wind turbine component vertically within the tower and the powered drive device configured to be coupled to the track in the second position when moving the wind turbine component along the track.

20. The transport system according to claim 13, wherein the track comprises a plurality of track segments which are configured to be coupled in an end-to-end fashion to form the track.

21. The transport system according to claim 13, wherein the powered drive device includes at least one winch system.

* * * * *